US011455451B2

(12) United States Patent
McKemey et al.

(10) Patent No.: US 11,455,451 B2
(45) Date of Patent: Sep. 27, 2022

(54) VERIFYING A HARDWARE DESIGN FOR A COMPONENT THAT IMPLEMENTS A PERMUTATION RESPECTING FUNCTION

(71) Applicant: Imagination Technologies Limited, Kings Langley (GB)

(72) Inventors: Robert McKemey, Hemel Hempstead (GB); Sam Elliott, London (GB); Emiliano Morini, Cambridge (GB); Max Freiburghaus, London (GB)

(73) Assignee: Imagination Technologies Limited, Kings Langley (GB)

( * ) Notice: Subject to any disclaimer, the term of this patent is extended or adjusted under 35 U.S.C. 154(b) by 400 days.

(21) Appl. No.: 16/367,493

(22) Filed: Mar. 28, 2019

(65) Prior Publication Data

US 2019/0303511 A1    Oct. 3, 2019

(30) Foreign Application Priority Data

Mar. 29, 2018 (GB) ...................... 1805285

(51) Int. Cl.
*G06F 30/3323* (2020.01)
*G06F 30/33* (2020.01)
*G06F 119/18* (2020.01)

(52) U.S. Cl.
CPC .......... *G06F 30/3323* (2020.01); *G06F 30/33* (2020.01); *G06F 2119/18* (2020.01)

(58) Field of Classification Search
CPC .................................................. G06F 30/3323
USPC ....................................................... 716/106
See application file for complete search history.

(56) References Cited

U.S. PATENT DOCUMENTS

| 9,665,829 B1* | 5/2017 | Jasionowski | .......... G06N 10/00 |
| 2003/0149945 A1* | 8/2003 | Abadir | .................... G06F 30/33 |
| | | | 716/107 |
| 2004/0230927 A1 | 11/2004 | Chen et al. | |
| 2010/0257494 A1 | 10/2010 | Pouarz et al. | |

OTHER PUBLICATIONS

Baumgartner et al., "An Overview and Application of Model Reduction Techniques in Formal Verification," 1998 IEEE International Performance, Computing and Communications Conference, Feb. 1998.

(Continued)

*Primary Examiner* — Eric D Lee
(74) *Attorney, Agent, or Firm* — Potomac Law Group, PLLC; Vincent M DeLuca

(57) ABSTRACT

Methods and systems for verifying a hardware design for a component that implements a permutation respecting function. The methods include formally verifying that an instantiation of the hardware design produces the correct result to the function for a subset of the valid input vectors; and formally verifying that an instantiation of the hardware design is permutation respecting for each of one or more input vector permutations (i.e. that the instantiation of the hardware design produces the permutation related outputs for an input vector and the permutation of that input vector) over a set of input vectors. The subset and the input vector permutations are selected so that any valid input vector that is not in the subset can be generated from an input vector in the subset via a combination of the one or more input vector permutations.

20 Claims, 8 Drawing Sheets

(56) References Cited

OTHER PUBLICATIONS

Extended European Search Report dated Oct. 4, 2019 in corresponding European Application No. 19165764.2.
Gotlieb, "Exploiting Symmetries to Test Programs," Proceedings of the 14th International Symposium on Software Reliability Engineering IEEE, Nov. 2003, p. 1-10, Denver, CO.
Gotlieb, et al., "A Semi-empirical Model of Test Quality in Symmetric Testing: Application to Testing Java Card APIs," Proceedings of the 6th International Conference on Quality Software, IEEE, Oct. 2006, p. 1-8, Beijing, China.
Wen, et al., "Functional Verification," Electronic Design Automation—Synthesis, Verification, and Test, Feb. 2009, p. 513-573, Morgan Kaufman Publishers, Burlington, MA.

\* cited by examiner $$x = (x_0, x_1, \ldots, x_{n-1})$$

EXAMPLE INPUT VECTOR PERMUTATIONS $$\sigma_{at-i} x = (x_0, \ldots, x_{i-1}, x_{i+1}, x_i, x_{i+2}, \ldots, x_{n-1})$$

$$\sigma_c x = (x_{n-1}, x_0, x_1, \ldots, x_{n-2})$$

EXAMPLE GENERATING SETS $$G = \{\sigma_{at-0}, \sigma_{at-1}, \ldots, \sigma_{at-n-2}\}.$$

$$G = \{\sigma_{at-0}, \sigma_c\}$$

VERIFYING A HARDWARE DESIGN FOR A COMPONENT THAT IMPLEMENTS A PERMUTATION RESPECTING FUNCTION

BACKGROUND

There are many functions which receive an input vector x comprising a plurality of input elements $(x_0, x_1, \ldots, x_{n-})$ and produce permutation related outputs for at least two different orderings (or permutations) of a set of input elements. A function is said to produce permutation related outputs if the function produces a first output in response to a first input vector, and produces a second output in response to a second input vector that is a permutation of the first input vector, and the second output can be deduced solely from the first output and the permutation. Such a function is referred to herein as a permutation respecting function. The set of input vector permutations for which a function is permutation respecting (i.e. produces permutation related outputs for an input vector and the permutation of the input vector) is referred to herein as the set or group of respected input vector permutations. Permutation respecting functions include, but are not limited to, functions F that are invariant with respect to one or more input vector permutations $\sigma$ (i.e. $F(\sigma x)=F(x)$); functions F that are equivariant with respect to one or more input vector permutations $\sigma$ (i.e. $\sigma F(x)=F(\sigma x)$); and functions that satisfy $t_\sigma(x)=F(\sigma x)$ wherein the input vector permutation $\sigma$ is mapped to the output transformation $t_\sigma$ by a homomorphism from the group of respected input vector permutations to the automorphism group of the outputs.

An example permutation respecting function is a sorting function $F_{sort}(a,b,c)$ which receives an input vector comprising three input elements a, b, c and outputs a vector comprising the input elements in ascending order. This function is a permutation respecting function because it is invariant with respect to all input vector permutations—i.e. it will produce the same output for any permutation of a set of input elements. For example, the function $F_{sort}$ will output 4, 5, 6 when it receives input elements 4, 5 and 6 in any order. Specifically, the function $F_{sort}$ will output 4, 5, 6 when it receives (i) a=4, b=5 and c=6, (ii) a=4, b=6 and c=5; (iii) a=5, b=4, c=6; (iv) a=5, b=6 and c=4; (v) a=6, b=4, and c=5, or, (vi) a=6, b=5, and c=4. Examples of other permutation respecting functions include, but are not limited to, a mean function that outputs the mean of a plurality of input elements; a median function that outputs the median of a plurality of input elements; a maximum function that outputs the maximum of a plurality of input elements; a minimum function that outputs the minimum of a plurality of input elements; and a function that receives a set of input elements that represent the entries of a square matrix and outputs the determinant of that matrix.

Many electronic devices, such as systems-on-chips (SoCs), include a component that implements a permutation respecting function. Generating a component that implements a permutation respecting function typically includes developing a hardware design that describes the structure and function of an integrated circuit that implements the permutation respecting function; verifying or testing the hardware design to ensure that an integrated circuit manufactured according to the design will behave as expected; and once verified, manufacturing an integrated circuit, at an integrated circuit manufacturing system, in accordance with the hardware design. Verifying the operation, or behaviour, of a hardware design for a component that implements a permutation respecting function comprises verifying that an instantiation of the hardware design produces the correct (or expected) output, according to the function, for all valid input vectors.

A hardware design may be verified, for example, by formal verification or simulation-based verification. Formal verification is a systematic process that uses a mathematical model of the hardware design and mathematical reasoning to verify the hardware design. In contrast, simulation-based verification is a process in which a hardware design is tested by applying stimuli to an instantiation of the hardware design and monitoring the output of the instantiation of the hardware design in response to the stimuli.

Formal verification can improve controllability as compared to simulation-based verification. Low controllability occurs when the number of simulation test signals or vectors required to thoroughly simulate a hardware design becomes unmanageable. For example, a 32-bit comparator requires $2^{64}$ test vectors. This may take millions of years to verify exhaustively by simulation-based verification. By performing formal verification, the 32-bit comparator can be verified in less than a minute.

While formal verification can be an effective method for exhaustively verifying properties of a hardware design, this is only true if the properties that are to be verified are presented in such a manner that a formal verification tool can solve the mathematical problem presented thereby. Specifically, during formal verification of a hardware design the hardware design is represented as a mathematical model, the properties to be proved are also represented mathematically, and mathematical reasoning is used to determine if the properties are true for the hardware design based on the mathematical model. In other words, in formal verification the verification is presented as a mathematical problem to be solved. Some mathematical problems will be solvable within a reasonable amount of time by a formal verification tool whereas others will not. When a formal verification tool is able to solve the mathematical problem presented by the hardware design and the properties to be verified then the formal verification is said to converge. When, however, a formal verification tool is unable to solve the mathematical problem presented by the hardware design and the properties to be verified, then the formal verification does not converge, and no results are output, and the verification is inconclusive.

The embodiments described below are provided by way of example only and are not limiting of implementations which solve any or all of the disadvantages of known methods and systems for verifying hardware designs for components that implement a permutation respecting function.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and systems for verifying a hardware design for a component that implements a permutation respecting function. The methods include formally verifying that an instantiation of the hardware design outputs the correct result to the function for a subset of valid input vectors; and formally verifying that an instantiation of the hardware design is permutation respecting for each of one or more input vector permutations (i.e. that an instantiation of the hardware design produces permutation related outputs for an input vector and the permutation of that input vector). The subset and the input vector permutations are selected so that any input vector that is not in the subset can be generated from an input vector in the subset via a combination of the one or more input vector permutations.

A first aspect provides a method of verifying a hardware design for a component that implements permutation respecting function, the component configured to receive an input vector comprising a plurality of input elements and generate an output based on the input vector and the function, the method comprising: verifying, at one or more processors, that an instantiation of the hardware design generates an expected output for each input vector of a subset of valid input vectors; and verifying, at the one or more processors, that, for each of one or more input vector permutations, an instantiation of the hardware design generates permutation related outputs for any input vector in a set of valid input vectors and the permutation of that input vector; wherein each valid input vector that is not in the subset of valid input vectors can be obtained by applying one or more of the one or more input vector permutations to an input vector in the subset.

A second aspect provides a system for verifying a hardware design for a component that implements permutation respecting function, the system comprising: memory comprising: the hardware design for a component that implements a permutation respecting function, the component configured to receive an input vector comprising a plurality of input elements and generate an output based on the input vector and the function; and one or more verification tools; and one or more processors configured to: verify, using one of the one or more verification tools, that an instantiation of the hardware design generates an expected output for each input vector of a subset of valid input vectors; and verify, using one of the one or more verification tools, that, for each of one or more input vector permutations, an instantiation of the hardware design generates permutation related outputs for any input vector in a set of valid input vectors and the permutation of that input vector; wherein each valid input vector that is not in the subset of valid input vectors can be obtained by applying one or more of the one or more input vector permutations to an input vector in the subset.

A hardware design for a component that implements a permutation respecting function, when processed in an integrated circuit manufacturing system, may configure the system to manufacture an integrated circuit embodying the component. There may be provided a non-transitory computer readable storage medium having stored thereon a hardware design for a component that implements a permutation respecting function that, when processed in an integrated circuit manufacturing system, causes the integrated circuit manufacturing system to manufacture an integrated circuit embodying the component.

There may be provided an integrated circuit manufacturing system comprising: a non-transitory computer readable storage medium having stored thereon a hardware design for a component that implements a permutation respecting function; a layout processing system configured to process the hardware design so as to generate a circuit layout description of an integrated circuit embodying the component; and an integrated circuit generation system configured to manufacture the integrated circuit embodying the component according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
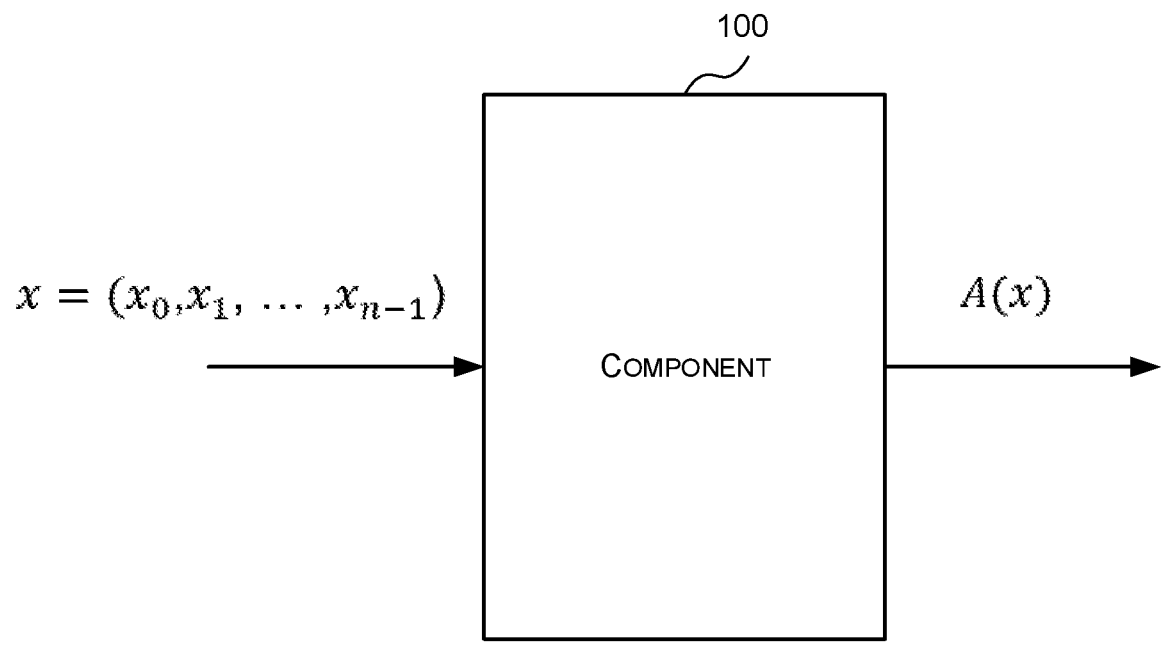
FIG. 1 is a block diagram of an example component that implements a permutation respecting function.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

While formal verification can provide advantages over simulation-based verification, methods known to the Applicant to formally verify a hardware design for a component that implements a permutation respecting function have proven inefficient (e.g. they take a long time to complete) and/or ineffective (e.g. they are unable to converge, thus they are unable to provide a conclusive answer). For example, one method that is known to the Applicant for formally verifying a hardware design for a component that implements a permutation respecting function comprises formally verifying that an instantiation of the hardware design produces the correct output in response to every valid input vector according to the function. This may be referred to herein as nave formal verification of a hardware design for a component that implements a permutation respecting function. Such a method has proven inefficient (e.g. proven to take a long time) when the number of input elements is large, and/or ineffective (e.g. unable to converge, or unable to produce a result) when the function is complex. It is noted that the fact that something is known to the Applicant does not mean that it is well known.

Accordingly, described herein are methods and systems for verifying a hardware design for a component that implements a permutation respecting function wherein the verification is broken down into a set of smaller verifications. Specifically, the methods include formally verifying that an instantiation of the hardware design outputs the correct result to the function for a subset of the valid input vectors; and formally verifying that an instantiation of the hardware design is permutation respecting for each of one or more input vector permutations (i.e. that an instantiation of the hardware design produces permutation related outputs for an input vector and the permutation of that input vector). The subset and the input vector permutations are selected so that any input vector that is not in the subset can be generated from an input vector in the subset via a combination of the one or more input vector permutations. The methods described herein have proven to be able to verify the hardware design for a component that implements a permutation respecting function much more quickly than using the nave method. The methods described herein have also been able to verify hardware designs for which the nave method was not able to converge (i.e. was not able to provide a definitive answer).

As described above, a permutation respecting function is a function F that receives an input vector x comprising a plurality of input elements $(x_0, x_1, \ldots, x_{n-})$ and produces permutation related outputs for at least two permutations of the same set of input elements. A function produces permutation related outputs if the function produces a first output in response to a first input vector x and a second output in response to a second input vector that is a permutation of the first input vector and the second output can be deduced solely from the first output and the permutation.

Each input element $x_i$ may comprise a single variable or may comprise a plurality of variables (e.g. each input element itself may be a vector or matrix that comprises a plurality of variables). For example, in some cases each input element may be a b-bit binary number, whereas in other cases each input element may be a vector or a matrix of b-bit binary numbers where b is an integer greater than or equal to 1.

A permutation $\sigma$ of an input vector x is a permutation (i.e. an ordering) of the input elements $x_i$ of the input vector x. Where the input vectors x have n input elements $x_i$ there will be n! permutations of an input vector x. For example, an input vector x comprising three input elements $(x_0, x_1, x_2)$ will have 3!=6 permutations (or orderings) $\sigma$ for a set of input elements $\{x_0, x_1, x_2\}$ as shown below. The collection of all possible permutations for a set of n input elements will be referred to herein as Sym(n). Accordingly, Sym(n) when n=3 is $\{\sigma_0, \sigma_1, \sigma_2, \sigma_3, \sigma_4, \sigma_5\}$.

$\sigma_0(x_0,x_1,x_2)=(x_0,x_1,x_2)$ $\sigma_1(x_0,x_1,x_2)=(x_0,x_2,x_1)$ $\sigma_2(x_0,x_1,x_2)=(x_1,x_0,x_2)$ $\sigma_3(x_0,x_1,x_2)=(x_1,x_2,x_0)$ $\sigma_4(x_0,x_1,x_2)=(x_2,x_0,x_1)$ $\sigma_5(x_0,x_1,x_2)=(x_2,x_1,x_0)$ The notation $F(\sigma x)$ is used to refer to the output of a function F for a permutation $\sigma$ of the input vector x. For example, where the input vectors comprise three input elements, $F(\sigma_2 x)$ is the output of the function F for an input vector where the order of $x_1$ and $x_2$ is swapped. In other words, $F(\sigma_2 x)=F(\sigma_2(x_0, x_1, x_2))=F((x_0, x_2, x_1))$.

As described above, permutation respecting functions include, but are not limited to, functions F that are invariant with respect to one or more input vector permutations $\sigma$ (i.e. $F(\sigma x)=F(x)$); functions F that are equivariant with respect to one or more input vector permutations $\sigma$ (i.e. $\sigma F(x)=F(\sigma x)$); and, functions that satisfy $t_\sigma(x)=F(\sigma x)$ wherein the input vector permutation $\sigma$ is mapped to the output transformation $t_\sigma$ by a homomorphism from the group of respected input vector permutations to the automorphism group of the outputs. As is known to those of skill in the art, an automorphism is an invertible function which maps some set to itself. Where the respected input vector permutations are related by a group homomorphism to output automorphisms, it follows that, if any respected input vector permutations $\sigma_a$ and $\sigma_b$ are such that $\sigma=\sigma_a\sigma_b$, then $\sigma$ is also respected and $t_\sigma=t_{\sigma_a}t_{\sigma_b}$ since $t_\sigma F(x)=F(\sigma x)=F(\sigma_a\sigma_b x)=t_{\sigma_a}F(\sigma_b x)=t_{\sigma_a}t_{\sigma_b}F(x)$.

As described above, an example permutation respecting function is a sorting function $F_{sort}(x_0, x_1, x_2)$ which receives an input vector x comprising three input elements $x_0, x_1, x_2$ and outputs a vector comprising the input elements in ascending order. This function is a permutation respecting function because it is invariant for all input vector permutations—i.e. it will produce the same result or output for any permutation of a set of input elements. For example, the function $F_{sort}$ will output (4, 5, 6) when it receives an input vector comprising 4, 5 and 6 in any order. Another example of a permutation respecting function is an index sorter function H which sorts the input elements and outputs a vector comprising an ordered list of the indices. This function is a permutation respecting function because it is equivariant for all input vector permutations. For example, if such a function receives an input vector with three input elements wherein $x_0<x_1<x_2$ then the function will output (0, 1, 2) indicating the $0^{th}$ input element is the smallest input element, the $1^{st}$ input element is the middle input element, and the $2^{nd}$ input element is the largest input element. If the order of the input elements changes then the output will change accordingly. For example, if the order of $x_0$ and $x_1$ are swapped then the location of 0 and 1 in the output will change accordingly (i.e. $H(x_1, x_0, x_2)=(1,0,2)$).

An example of a permutation respecting function that satisfies $t_\sigma F(x)=F(\sigma x)$ is an index function which outputs an index of a particular element (e.g. the index of the maximum element or the minimum element) in the input vector. Such a function may output 0 when the maximum element is the first element and may output 1 when the maximum element is the second element and so on. Another example of a permutation respecting function that satisfies $t_\sigma F(x)=F(\sigma x)$ is $h(A,C)=h((a,b), (c,d))=ab-cd$ because $h(A,C)=-h(\sigma_a(A, C))=-h(C,A)$ where $\sigma_a$ swaps the position of the two input elements A and C.

Other example permutation respecting functions include, but are not limited to, mean functions that output the mean of a set of input elements; median functions that output the median of a set of input elements; maximum functions that output the maximum of a set of input elements; minimum functions that output the minimum of a set of input elements; intersection functions that determine the intersection of a set of input elements, such as, functions which determine the intersection of rays or other shapes; search functions which output an indication of whether an element occurs in a set of input elements; counting functions which count the number of times an element appears in a set of input elements; functions which relate to summing or multiplying a set of input elements, such as, functions that find the dot product of a plurality of vectors; functions that find the mean or standard deviation of a set of input elements; and functions where the output is linked to the permutation in a predetermined way.

A permutation respecting function may be permutation respecting for all input vector permutations (i.e. for all $\sigma \in \text{Sym}(n)$) or it may only be permutation respecting for a subset of input vector permutations (i.e. for some subset of $\sigma \in \text{Sym}(n)$). For example, a sorting function is permutation respecting for all input vector permutations because it will produce the same output regardless of the order of the input elements in the input vector. In other words, a sorting function will produce the same output for any permutation of an input vector x. An example of a function which is only permutation respecting for a subset of the input vector permutations is a dot product: f (a, b, c, d)=ab+cd, which is permutation respecting for the input vector permutation that swaps a and b, the input vector permutation that swaps c with d, and the input vector permutation that swaps a and c, and b and d, but is not permutation respecting for other input vector permutations, such as, the input vector permutation that swaps a and c. Another example of a function that is only permutation respecting for a subset of the input vector permutations is the function g(a, b, c, d)=ad−bc, which calculates the determinant of the 2×2 matrix $$\begin{pmatrix} a & b \\ c & d \end{pmatrix}.$$

An input vector permutation that swaps a and d, or swaps b and c doesn't change the output, but the input vector permutation that swaps a and b, and swaps c and d would negate the output (g(b, a, d, c)=bc−ad=−(ad−bc)=−g(a, b, c, d)), such that $t_{(a\ d)} = t_{(b\ c)}$=the identity map and $t_{(a\ b)(c\ d)}$=negation. The input vector permutations for which a function is permutation respecting (i.e. the function produces permutation related outputs for an input vector and the permutation of the input vector) are referred to herein as the respected input vector permutations E wherein E⊆Sym(n).

As shown in FIG. 1, a component A 100 that implements a permutation respecting function F comprises hardware logic configured to receive an input vector x, calculate the result F(x) of the permutation respecting function F for the received input vector, and output the calculated result A(x). The notation A(x) is used herein to refer to the output of the component A in response to an input vector x. When the component A is working as expected A(x)=F(x). Similar to the notation F(σx), the notation A(σx) is used herein to refer to the output of the component A in response to a permutation σ of the input vector x. For example, where the input vectors comprise three input elements, $A(\sigma_2 x)$ is the output of the component A in response to an input vector where the order of $x_1$ and $x_2$ is swapped. In other words, $A(\sigma_2 x)=A(\sigma_2(x_0, x_1, x_2))=A((x_0, x_2, x_1))$.

Figure 2:
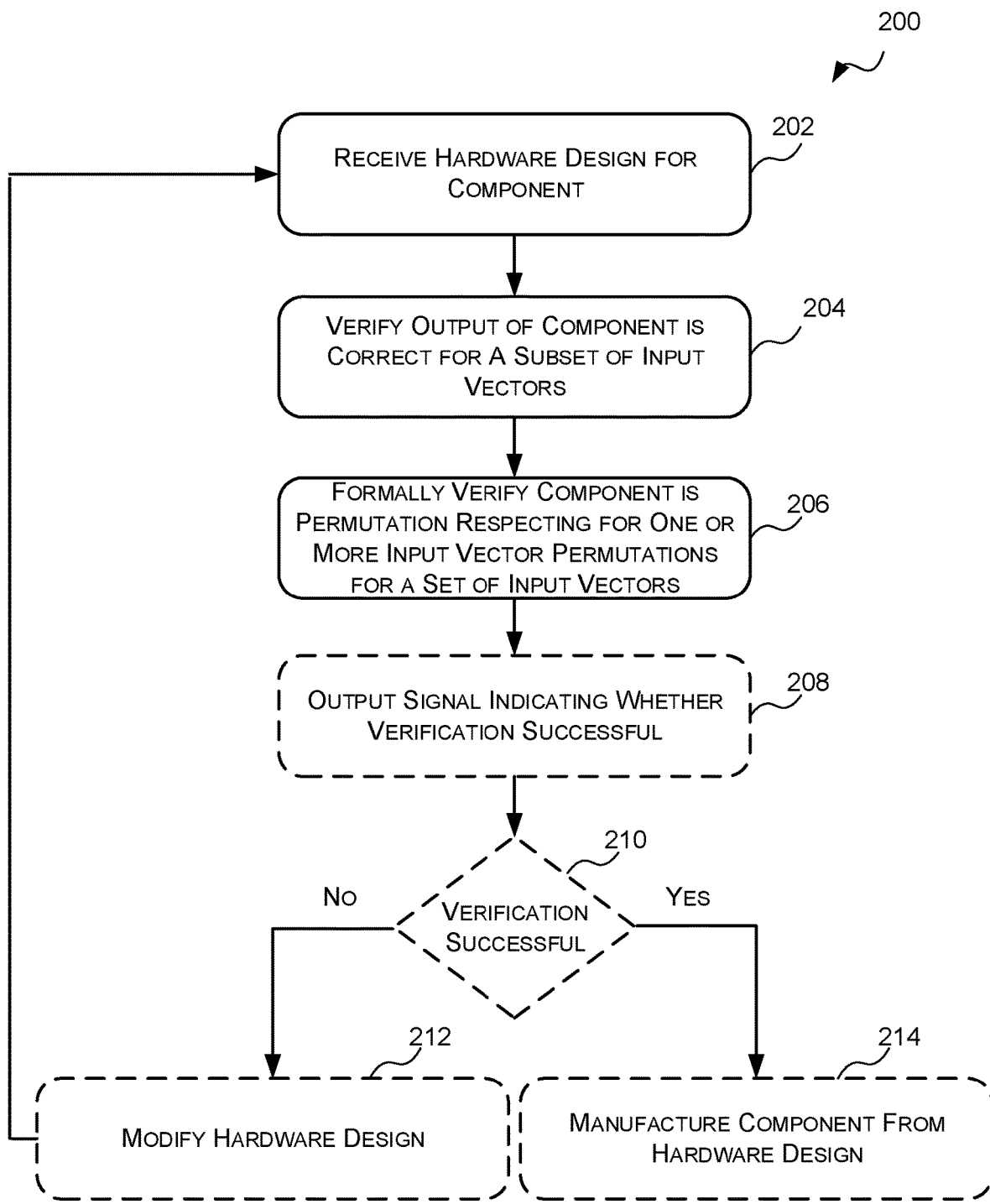
FIG. 2 is a flow diagram of an example method for verifying a hardware design for a component that implements a permutation respecting function.

Reference is now made to FIG. 2 which illustrates an example method 200 of verifying a hardware design for a component that implements a permutation respecting function. The method 200 may be implemented by a computing-based device such as, but not limited to, the computing-based device 600 described below with respect to FIG. 6. For example, there may be a computer readable storage medium having stored thereon computer readable instructions that, when executed at a computing-based device, cause the computing-based device to perform the method 200 of FIG. 2.

The method comprises formally verifying that an instantiation of the hardware design produces the correct result for a subset of the valid input vectors; and formally verifying that the hardware design is permutation respecting for one or more input vector permutations (i.e. produces permutation related outputs in response to any input vector in a set of input vectors and the permutation of the input vector). As described above, the set of input vector permutations for which the function implemented by the component is permutation respecting is referred to as the respected input vector permutations E, wherein E⊆Sym(n). Each respected input vector permutation is either covered by the subset or can be generated from the one or more input vector permutations that are verified. The respected input vector permutations that are not covered by the subset are referred to herein as the relevant input vector permutations R wherein R is equal to E or is a subset of E. Accordingly, R⊆E⊆Sym(n).

The method 200 begins at block 202 where a hardware design for a component that implements a permutation respecting function is received.

A "hardware design" is a description of the structure and function of an integrated circuit which when processed at an integrated circuit manufacturing system causes the integrated circuit manufacturing system to generate an integrated circuit described by the hardware design. For example, as described in more detail below with respect to FIG. 8, when a hardware design is processed at an integrated circuit manufacturing system the integrated circuit manufacturing system may generate the integrated circuit by synthesizing the hardware design into silicon, or, by loading configuration data into a field-programmable gate array (FPGA).

A hardware design may be implemented in a high-level hardware description language (HDL), such as, but not limited to, a register transfer level (RTL) language. Examples of register transfer level languages include, but are not limited to, VHDL (VHSIC Hardware Description Language) and Verilog®. It will be evident to a person of skill in the art that other high-level hardware description languages may be used such as proprietary high-level hardware description languages.

An "instantiation of a hardware design" is a representation of the hardware and/or functionality of the hardware defined by the hardware design. An instantiation of a hardware design includes, but is not limited to, an emulation model of the hardware design that simulates the behaviour of the hardware defined by the hardware design, a synthesized version (e.g. netlist) of the hardware design, a hardware implementation (e.g. integrated circuit or a field-programmable gate array (FPGA)) of the hardware design, and a mathematical model of the hardware design generated by a formal verification tool. An instantiation of the hardware design embodies the hardware design in a form which can be tested to verify the hardware design.

A hardware design for a component that implements a permutation respecting function is thus a description of the structure and function of an integrated circuit that implements a permutation respecting function which, when processed at an integrated circuit manufacturing system causes the integrated circuit manufacturing system to generate an integrated circuit that implements a permutation respecting function.

Once the hardware design for the component that implements a permutation respecting function has been received the method 200 proceeds to block 204.

At block 204, it is formally verified that an instantiation of the hardware design (i.e. an instantiation of the component described by the hardware design) produces the correct output for a subset of the valid input vectors. Specifically, if the input space representing the valid input vectors x is X such that all input vectors x are elements of X ($x \in X$) then it is formally verified that an instantiation of the hardware design produces the correct result for all x in $\mathcal{B}$ ($x \in B$) where $\mathcal{B}$ is a subset of X ($\mathcal{B} \subset X$). The term subset is used herein to mean a set that is less than the set from which it was formed. Accordingly, the subset $\mathcal{B}$ comprises fewer input vectors than the input space X. The input vectors that form the subset $\mathcal{B}$ may be referred to as the base cases, and formally verifying that an instantiation of the hardware design produces the correct output for the input vectors in the subset $\mathcal{B}$ may be referred to as formally verifying the base cases.

The subset $\mathcal{B}$ is selected so that all input vectors x in the input space X that are not in the subset $\mathcal{B}$ are a relevant permutation of an input vector x in the subset $\mathcal{B}$. In other words, the subset $\mathcal{B}$ is selected so that every input vector x in the input space X is in the subset $\mathcal{B}$ and/or is a relevant permutation of an input vector in the subset $\mathcal{B}$. Accordingly, the subset $\mathcal{B}$ includes at least one input vector for each possible set of input elements that represents one permutation, or one ordering, of that set of input elements.

In some cases, the subset $\mathcal{B}$ may include only one input vector for each possible set of input elements $x_i$ (which may be referred to herein as a minimum-sized subset $\mathcal{B}$). Selecting a subset $\mathcal{B}$ that only comprises one input vector for each possible set of input elements $x_i$ reduces the number of states that have to be verified which may allow the formal verification of the correctness of the output for the input vectors in the subset $\mathcal{B}$ to complete more quickly. In these cases, the subset $\mathcal{B}$ may be selected so as to include all input vectors x in the input set X where the input elements $x_i$ are in a predetermined order.

Preferably the subset $\mathcal{B}$ comprises input vectors where the output thereof is easy to deduce. The subset $\mathcal{B}$ may be selected based on the permutation respecting function that is implemented by the component. Testing has shown that a good subset $\mathcal{B}$ for a sorting function is the subset $\mathcal{B}$ of input vectors where the output is equal to the input. Accordingly, the subset $\mathcal{B}$ for a sorting function which sorts the input elements into ascending order may comprise the input vectors in which the input elements $x_i$ are in ascending order (i.e. $x_0 \leq x_1 \leq \ldots \leq x_{n-1}$). Similarly, the subset $\mathcal{B}$ for a sorting function which sorts the input elements in descending order may comprises the input vectors in which the input elements are in descending order (i.e. $x_0 \geq x_1 \geq \ldots \geq x_{n-1}$).

Figure 3:
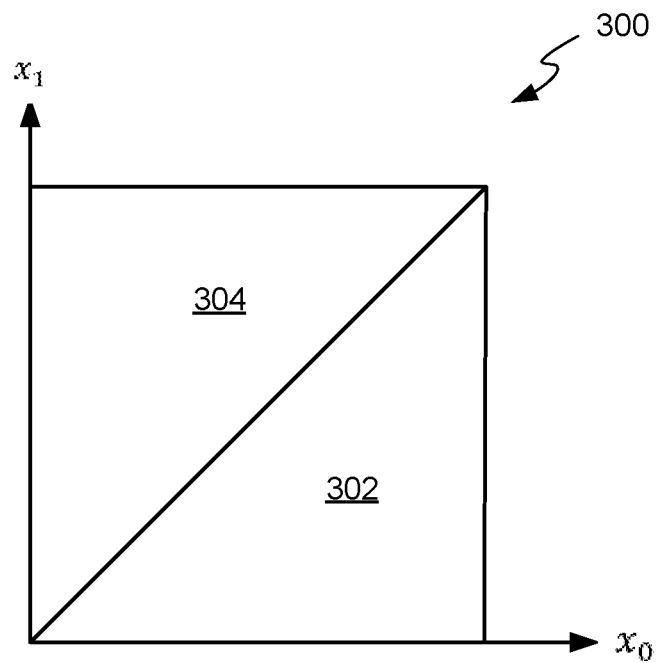
FIG. 3 is a graph of the input space of an example permutation respecting function.

Reference is now made to FIG. 3 which shows a graph 300 of the input space X for a sorting component A that receives an input vector x comprising two input elements $x_0$ and $x_1$ and outputs a vector comprising the input elements $x_0$ and $x_1$ in ascending order. In this example, the subset $\mathcal{B}$ of valid input vectors may comprise the input vectors in which the input elements are in ascending order (i.e. $x_0 \leq x_1$). Region 302 represents the portion of the input space X in which the input elements $x_0$ and $x_1$ are in ascending order (i.e. subset $\mathcal{B}$). Where there are only two input elements there will be two permutations, $\sigma_1(x_0, x_1) = (x_0, x_1)$ and $\sigma_2(x_0, x_1) = (x_1, x_0)$. Region 304 represents the portion of the input space X that represents the input vectors x that are a permutation $\sigma_2$ of the input vectors x in the subset $\mathcal{B}$ (which may be denoted $\sigma_2 \mathcal{B}$). Accordingly, as can be seen from FIG. 3, together the two regions 302 ($\mathcal{B}$) and 304 ($\sigma_2 B$) cover the entire input space X indicating that this is an appropriate subset $\mathcal{B}$. It is noted that the input vectors where $x_1 = x_2$ fall in both regions 302 ($\mathcal{B}$) and 304 ($\sigma_2 \mathcal{B}$), indicating that if it is formally verified in block 206 that the hardware design is permutation respecting for the permutation $\sigma_2$ there will be some redundancy in the verification.

A subset $\mathcal{B}$ that includes the input vectors in which the input elements are in ascending or descending order may also be appropriate for minimum and maximum functions which output the minimum or maximum of the input elements, and for a median function that returns the median input element in the input vector because the correct output for such base cases can be determined directly from the input vector. For example, the output of a minimum or maximum function will be the first or last input element of an input vector in ascending ordering. A suitable subset $\mathcal{B}$ for a search function which indicates whether a particular element is in the input vector may be the input vectors in which the particular element is the first element in the input vector or the particular element is not in the input vector at all. A suitable subset $\mathcal{B}$ for a counting function which counts the number of times an element occurs in an input vector may be the input vectors in which the element occurs a predetermined number of times at the beginning of the input vector and nowhere else. It will be evident to a person of skill in the art that these are example subsets B only and that other subsets B may be used.

In other cases, the subset $\mathcal{B}$ may have more than the minimum number of input vectors. For example, instead of the subset $\mathcal{B}$ comprising only one input vector for each set of input elements, the subset $\mathcal{B}$ may comprise two or more input vectors with the same set of input elements in different orders.

In some cases, the size of the subset $\mathcal{B}$ may be expanded (compared to a minimum-sized subset $\mathcal{B}$) because it may be more efficient to have a larger subset $\mathcal{B}$ and verify less input vector permutations in block 206. For example, if a component implements a sorting function by separately sorting the first half of the input elements and the second half of the input elements, and then merging the two halves it may take a long time to formally verify in block 206 the permutation in which the two middle input elements are transposed. This is because the differences between the two halves will propagate to the merge stage whereas for other permutations (e.g. permutations which relate to transpositions of input elements in the same half) the differences may be removed after the initial sorting stage. In this example, instead of the subset $\mathcal{B}$ comprising the input vectors in which the input elements are in ascending order, it may be more efficient to use a subset $\mathcal{B}$ that comprises the input vectors in which the first half is sorted, and the second half is sorted. For example, if the number of input elements n is even, the subset $\mathcal{B}$ may comprise the set of input vectors x wherein $$x_0 \leq x_1 \ldots \leq x_{\frac{n}{2}-1} \text{ and } x_{\frac{n}{2}} \leq \ldots \leq x_{n-1}.$$

If the input elements $x_i$ are unique there will be n! permutations of a set of input elements. Since there will be only one permutation of a set of input elements in which the input elements are in ascending order, a subset $\mathcal{B}$ of input vectors in which the input elements are in ascending order will comprise only one input vector for each set of input elements. However, there are $$\binom{n}{2} = \frac{n!}{((n/2)!)^2}$$

permutations or a set of input elements in which the first half of the input elements are in ascending order and the second half of input elements are in ascending order, thus a subset $\mathcal{B}$ of input vectors in which the first half of the input elements are in ascending order and the second half of the input elements are in ascending order will comprise $$\frac{n!}{((n/2)!)^2}$$

input vectors for each set of input elements. Since there are n! permutations of a set of input elements such a subset $\mathcal{B}$ will be $((n/2)!)^2$ times smaller than the input space X, but it will be $$\frac{n!}{((n/2)!)^2}$$

times larger than a subset that comprises only one input vector per set of input elements. Table 1 illustrates the difference in the size of such a subset relative to the input space X and relative to a subset that is of the minimum size.

TABLE 1

| n | Number of Times Smaller than X $((n/2)!)^2$ | Number of Times Larger than subset of minimum size $\frac{n!}{((n/2)!)^2}$ |
| --- | --- | --- |
| 4 | 4 | 6 |
| 6 | 576 | 70 |
| 16 | $1.6 \times 10^9$ | $1.2 \times 10^4$ |
| 32 | $4.4 \times 10^{26}$ | $6.0 \times 10^8$ |

In addition, or alternatively, to expanding the size of the subset $\mathcal{B}$ to cover a permutation that it is not efficient to verify in block 206, the subset $\mathcal{B}$ may also be expanded when the permutation respecting function implemented by the component is not permutation respecting for all possible input permutations of a set of input elements (i.e. the function is not permutation respecting for all σ∈Sym(n)). Specifically, in these cases the subset may comprise at least two permutations of one more sets of input elements wherein the at least two permutations include the permutations for which the function is not permutation respecting.

In general, any permutation that is not verified in block 206 either because it is not efficient to verify in block 206 or because the permutation respecting function implemented by the component is not permutation respecting with respect to that permutation is covered by the subset $\mathcal{B}$. For example, if the permutation respecting function implemented by the component is not permutation respecting for a permutation in which the first two input elements (e.g. $x_0$ and $x_1$) are swapped then the subset will include input vectors ($x_0$, $x_1$, ..., $x_{n-1}$) and ($x_1$, $x_0$, ..., $x_{n-1}$) for all sets of input elements.

As described above, formal verification is a systematic process that uses mathematical reasoning to verify a property of a hardware design. In contrast, simulation-based verification is a process in which a hardware design is tested by applying stimuli to an instantiation of the hardware design and monitoring the output of the instantiation of the hardware design in response to the stimuli.

Formally verifying that an instantiation of the hardware design will produce the correct output in response to any input vector in the subset $\mathcal{B}$ may comprise formally verifying one or more formal assertions are true, or hold, for the hardware design which if verified to be true establish that an instantiation of the hardware design will produce the correct output in response to any input vector in the subset $\mathcal{B}$. An assertion may also be referred to as a "lemma" in some programming languages and tools, such as Synopsys' HECTOR.

As is known to those of skill in the art, a formal assertion is a statement or expression that indicates that a formal property must be true for an instantiation of the hardware design to be behaving as expected. An example format for a formal assertion is assert property [FORMAL PROPERTY STATEMENT] which indicates that the FORMAL PROPERTY STATEMENT must be true. A formal property statement is a statement or expression that captures design behaviour. For example, a formal property statement for the property that signal a of the hardware design is equal to signal b of the hardware design may be a=b. Within HDL designs, a formal property statement is an executable statement that checks for specific behaviour within the HDL design. Formal property statements are used to capture required or desired temporal behaviour of an instantiation of the hardware design in a formal and unambiguous way.

Formal assertions are typically written in an assertion language. An assertion language, which also may be referred to as a property language, captures the design behaviour over multiple design cycles in a concise, unambiguous manner. While traditional hardware description languages (HDL), such as VHDL or Verilog RTL, have the ability to capture individual cycle behaviour, they are too detailed to describe properties at a higher level. In particular, assertion languages provide means to express temporal relationships and complex design behaviours in a concise manner. Assertion languages include, but are not limited to, SystemVerilog Assertions (SVA), Property Specification Language (PSL), Incisive® Assertion Library (IAL), Synopsys® OpenVera™ Assertions (OVA), Symbolic Trajectory Evaluation (STE), Hardware Property Language (HPL), 0-In®, and Open Verification Library (OVL).

In some cases, the one or more formal assertions used to verify an instantiation of the hardware design produces the correct output for the base cases may comprise one or more formal assertions that assert a property that establishes the correctness of the output solely from the input. Such assertions may be suitable in cases where, for example, the output for the base cases is equal to all or part of the input vector. For example, where the hardware design is for a component that implements a sorting function that outputs a vector comprising the input elements in ascending order, and the base cases include the input vectors in which the input elements are in ascending order, the one or more formal assertions may comprise an assertion that asserts that the output vector of an instantiation of the hardware design is equal to the input vector of the instantiation of the hardware design.

In other cases, the one or more formal assertions used to verify an instantiation of the hardware design produces the correct output for the base cases may comprise one or more formal assertions that assert a property that establishes the correctness of the output by comparing the output to a model of the component. Such assertions may be suitable in cases where, for example, the output for the base cases is more complex to calculate and/or is not common across all base cases. For example, where the hardware design is for a component that implements a multiplication function that outputs the product of the input elements, and the base cases include input vectors in which the input elements are in ascending order, the one or more formal assertions may comprise an assertion that compares the output of the instantiation of the hardware design to the output of a model of the component.

Once the formal assertions have been established, a formal verification tool is used to formally verify that the one or more formal assertions are true, or hold, for the hardware design. A formal verification tool is a software tool that is capable of performing formal verification of a hardware design. Formal verification tools include, but are not limited to, formal model checkers (which also may be referred to as formal property checkers) which are configured to formally verify a property of an integrated circuit hardware design; and formal equivalence checkers which are configured to formally verify the equivalence of two designs (e.g. two integrated circuit hardware designs, or an integrated circuit hardware design and a netlist etc.). Examples of formal model checkers include, but are not limited to, OneSpin 360® DV, Mentor Graphics Questa® Formal Verification, Synopsys® VC Formal, Cadence® Incisive® Enterprise Verifier, and JasperGold®. Examples of formal equivalence checkers include, but are not limited to Synopsys® HECTOR, JasperGold® Sequential Equivalence Checking (SEC) App, and other logical equivalence checkers (LECs) and sequential logical equivalence checkers (SLECs).

In formal verification the hardware design (e.g. the hardware design for a component that implements a permutation respecting function) is transformed into a mathematical model (e.g. a state-transition system, or a flow graph) to thereby provide an instantiation of the hardware design which can be tested to verify the hardware design, and the formal properties to be verified (e.g. the asserted properties) are expressed using mathematical logic using a precise syntax or a language with a precise mathematical syntax and semantics.

A formal verification tool verifies an assertion by searching the entire reachable state space of the instantiation of the hardware design (e.g. state-transition system, or flow graph) without explicitly traversing all the states to determine if there is a valid state of the instantiation of the hardware design (as defined by formal constraints) in which the asserted property is not true. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability. Since formal verification of an assertion algorithmically and exhaustively explores all valid input values over time, verifying a property in this manner allows a property to be exhaustively proved or disproved for all valid states.

Once it has been formally verified that an instantiation of the hardware design produces the correct output in response to each input vector x in the subset $\mathcal{B}$ the method 200 proceeds to block 206.

At block 206, it is formally verified that an instantiation of the hardware design is permutation respecting for each of one or more relevant input vector permutations over a set of input vectors K in the input space X. Specifically, it is verified, for each of the one or more relevant input vector permutations σ, that an instantiation of the hardware design will produce permutation related outputs for any input vector x in a set of input vectors K and for the permutation of that input vector σx. The relevant input vector permutations that are verified in block 206, and the set of input vectors K over which they are verified, are selected so that for every input vector x in the input space X the corresponding output is either explicitly verified to be correct (block 204), or is verified to be permutation related to an output that has been explicitly verified (block 206).

Formally verifying that an instantiation of the hardware design is permutation respecting for each of one or more relevant input vector permutations over a set of input vectors K, may comprise formally verifying, for each of the one or more relevant input vector permutations, a set of assertions are true or hold, for the hardware design which if verified to be true establish that an instantiation of the hardware design is permutation respecting for an input vector permutation. The formal verification that an instantiation of the hardware design is permutation respecting for a particular relevant input vector permutation may be performed separately or jointly from the formal verification that an instantiation of the hardware design is permutation respecting for another relevant input vector permutation. Specifically, the formal verification of the one or more assertions corresponding to a particular input vector permutation may be performed separately or jointly from, the formal verification of the one or more assertions corresponding to another input vector permutation. For example, in some cases the formal verification that an instantiation of the hardware design is permutation respecting for different input vector permutations may be performed serially or in parallel.

In some cases, the relevant input vector permutations that are verified in block 206 include all of the relevant input vector permutations (i.e. all input vector permutations σ∈R), and the set of input vectors over which they are verified is the subset $\mathcal{B}$ (i.e. K=$\mathcal{B}$). Where the function is such that all input vector permutations are respected, the relevant input vector permutations that are verified may include all of the input vector permutations. It is noted that in these cases, there are n! relevant permutations, and if the subset $\mathcal{B}$ is the minimum size the subset $\mathcal{B}$ comprises roughly |X|/n! input vectors, so n!|X|/n!=|X| verifications will be performed which is the same number of verifications that will be performed during a nave verification. However, these verifications may be easier for the formal verification tool to complete.

In typical applications, the set R of relevant input permutations forms a group. In that case, verifying that, for every relevant input vector permutation, the outputs of an instantiation of the hardware design are permutation related for any input vector x in the subset $\mathcal{B}$ (for any ∈$\mathcal{B}$) and the permutation of the input vector σx, verifies that the instantiation of the hardware design will produce permutation related outputs for any input vector x and any relevant input vector permutation of the input vector σx. In other words, this verifies that the output for every input vector x that is not in the subset $\mathcal{B}$ is permutation related, to an output that has been explicitly verified. A mathematical proof that establishes this is described below.

However, verifying that an instantiation of the hardware design is permutation respecting for each relevant input vector permutation over all input vectors x in the subset $\mathcal{B}$ comprises generating a set of one or more assertions for each relevant input vector permutation, which if verified to be true for the hardware design, verifies that the hardware design is permutation respecting for that input vector permutation. Since there may be up to n! relevant input vector permutations (where n is the number of input elements) the number of assertions to be generated may quickly become unmanageable as n increases. For example, when n is 3, n! is equal to 6, however, when n is 8, n! quickly jumps up to 40,320.

Accordingly, in other cases, instead of verifying that the instantiation of the hardware design is permutation respecting for every relevant input vector permutation over the input vectors x in the subset $\mathcal{B}$, it is verified that the instantiation of the hardware design is permutation respecting for each input vector permutation in a generating set G of the relevant input vector permutations over all input vectors x in the input set X. Since the generating set G typically comprises only a subset of the relevant input vector permutations, verifying that the instantiation of the hardware design is permutation respecting for the input vector permutation in the generating set G comprises verifying that the hardware design is permutation respecting for fewer permutations, but over more input vectors (i.e. over the entire input space X instead of the subset $\mathcal{B}$).

A generating set G of input vector permutations is a set of input vector permutations $\phi_i$ (e.g. $G=\{\phi_i | i=1, \ldots, m\}$) from which all of the relevant input vector permutations R can be generated. Accordingly, $G \subseteq R \subseteq E \subseteq Sym(n)$ and it follows that R is a group if it is generated as follows: A relevant input vector permutation $\sigma$ can be generated from a generating set G of input vector permutations if the input vector permutation $\sigma$ can be written as a sequence of the input vector permutations $\phi_i$ in the generating set G. Specifically, a relevant input vector permutation $\sigma$ can be generated from a generating set G of input vector permutations if the input vector permutation $\sigma$ can be written in the form:

$$\sigma = \phi_{i_0}^{s_0} \ldots \phi_{i_k}^{s_k} \text{ for some } i_0 \ldots i_k \in \{1, \ldots m\}, s_0 \ldots s_k \in \{1, -1\}$$

where $\phi_i^1$ is equal to $\phi_i$, and $\phi_i^{-1}$ is the reverse or inverse permutation of $\phi_i$ such that $\phi_i^1 \phi_i^{-1}$ or $\phi_i^{-1} \phi_i^1$ leaves all the elements in the same order.

Verifying that for every input vector permutation in the generating set G of input vector permutations that the outputs of an instantiation of the hardware design in response to: (i) any input vector x in the input space X; and (ii) the permutation of the input vector x, are permutation related, verifies that the instantiation of the hardware design will produce permutation related outputs for any input vector x and any relevant permutation of the input vector σx. A mathematical proof that establishes this is described below.

In some cases, the generating set G may comprise only adjacent transpositions. A transposition is a permutation in which the position of two elements $x_i$ in the n-element input vector is swapped (e.g. element i is swapped with element i+4) and all other elements remain in the same position. An adjacent transposition is a transposition in which the position of two adjacent elements is swapped (e.g. element i is swapped with element i+1). An adjacent transposition which swaps the $i^{th}$ element and the $(i+1)^{th}$ element is denoted $\sigma_{at-i}$ (see, for example, FIG. 4):

$$\sigma_{at-i} x = \sigma_{at-i}(x_0, \ldots, x_{i-1}, x_i, x_{i+1}, x_{i+2}, \ldots, x_{n-1}) = (x_0, \ldots, x_{i-1}, x_{i+1}, x_i, x_{i+2}, \ldots, x_{n-1})$$

For example, the permutation $\sigma_{at-0}$ swaps the $0^{th}$ element and the $1^{st}$ element:

$$\sigma_{at-0} x = (x_1, x_0, x_2, \ldots, x_{n-1})$$

Since an adjacent transposition is the smallest change to an input vector, formal verification tools are typically (although not always) able to efficiently prove that the outputs for any input vector x and for the permutation of that input vector according to an adjacent transposition $\sigma_{at-i}$ are permutation related.

It can easily be shown that any input vector permutation $\sigma_t$ in Sym(n) can be generated from the set of adjacent transpositions $\{\sigma_{at-0}, \sigma_{at-1}, \ldots, \sigma_{at-n-2}\}$. For example, as described above, if the input vectors x comprise three input elements (i.e. n=3) then there are n!=6 permutations i.e. $Sym(n)=\{\sigma_0, \sigma_1, \sigma_2, \sigma_3, \sigma_4, \sigma_5\}$. Each of the input vector permutations $\sigma_i$ can be written as a combination of one or more adjacent transpositions in the set $\{\sigma_{at-0}, \sigma_{at-1}\}$ as shown below:

$$\sigma_0(x_0, x_1, x_2) = (x_0, x_1, x_2) = \sigma_{at-i} \sigma_{at-i} x = x$$

$$\sigma_1(x_0, x_1, x_2) = (x_0, x_2, x_1) = \sigma_{at-1} x$$

$$\sigma_2(x_0, x_1, x_2) = (x_1, x_0, x_2) = \sigma_{at-0} x$$

$$\sigma_3(x_0, x_1, x_2) = (x_1, x_2, x_0) = \sigma_{at-1} \sigma_{at-0} x$$

$$\sigma_4(x_0, x_1, x_2) = (x_2, x_0, x_1) = \sigma_{at-0} \sigma_{at-1} x$$

$$\sigma_5(x_0, x_1, x_2) = (x_2, x_1, x_0) = \sigma_{at-1} \sigma_{at-0} \sigma_{at-1} x$$

Specifically, the first permutation $\sigma_0$ can be generated by performing any of the adjacent transpositions twice (i.e. by swapping any two elements and then swapping them again); the second permutation $\sigma_1$ can be generated by swapping the $1^{st}$ and $2^{nd}$ elements (i.e. by performing permutation $\sigma_{at-1}$); the third permutation $\sigma_2$ can be generated by swapping the $0^{th}$ and $1^{st}$ elements (i.e. by performing permutation $\sigma_{at-0}$); the fourth permutation $\sigma_3$ can be generated by swapping the $0^{th}$ and $1^{st}$ elements (i.e. by performing permutation $\sigma_{at-0}$) and then swapping the $1^{st}$ and $2^{nd}$ elements (i.e. by performing permutation $\sigma_{at-1}$); the fifth permutation $\sigma_4$ can be generated by swapping the $1^{st}$ and $2^{nd}$ elements (i.e. by performing permutation $\sigma_{at-1}$) and then swapping the $0^{th}$ and $1^{st}$ elements (i.e. by performing permutation $\sigma_{at-0}$); and the sixth permutation $\sigma_5$ can be generated by swapping the $1^{st}$ and $2^{nd}$ elements (i.e. by performing permutation $\sigma_{at-1}$), swapping the $0^{th}$ and $1^{st}$ elements (i.e. by performing permutation $\sigma_{at-0}$), and then swapping the $1^{st}$ and $2^{nd}$ elements (i.e. by performing permutation $\sigma_{at-1}$).

Figure 4:
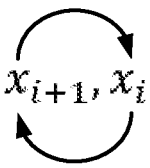
FIG. 4 is a schematic diagram that illustrates example input vector permutations and example generating sets based thereon.
Figure 4:
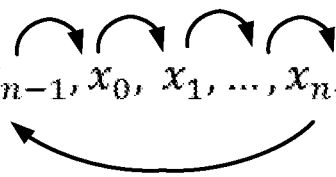

Accordingly, in some cases, the generating set G may comprise $\{\sigma_{at-0}, \sigma_{at-1}, \ldots, \sigma_{at-n-2}\}$ (see, for example, FIG. 4). Verifying that an instantiation of the hardware design is permutation respecting for each of the permutations in such a generating set comprises generating and verifying a set of assertions for each of n−1 permutations. This significantly reduces, particularly for large n, the number of assertions that have to be generated relative to verifying each relevant input vector permutation as there may be up to n! relevant input vector permutations.

Using such a generating set also allows the input vectors over which the permutation is verified to be reduced to a subset of the input vectors x in the input space X instead of all of the input vectors x in the input space X. Since adjacent transpositions are self-inverse (i.e. $\sigma_{at\text{-}i} = \sigma_{at\text{-}i}^{-1}$), verifying that an instantiation of the hardware design is permutation respecting for each adjacent transposition $\sigma_{at\text{-}i}$ over the subset of input vectors where $x_i$ and $x_{i+1}$ are in ascending order (i.e. $x_i \leq x_{i+1}$) verifies that the instantiation of the hardware design is permutation respecting for the adjacent transposition over all x in the input space X. This is because if it is proven that $A(x) = A(\sigma_{at\text{-}i} x)$ for all x where $x_i \leq x_{i+1}$ then for any input vector x in the input set, either $x_i < x_{i+1}$ meaning it will occur on the left-hand side of the equation, $x_i > x_{i+1}$ meaning it will occur on the right-hand side of the equation, or $x_i = x_{i+1}$ meaning it will occur on both the left-hand side and the right-hand side of the equation. Reducing the input space in this manner reduces the number of input vectors over which the permutation is verified by a factor of two. Although this may seem like a trivial reduction it can significantly reduce the amount of time to formally verify that an instantiation of a hardware design is permutation respecting for an adjacent transposition. Similarly to the above, the verification that $A(x) = A(\sigma_{at\text{-}i} x)$ could be reduced to the subset of input vectors where $x_i$ and $x_{i+1}$ are in descending order.

In other cases, the generating set G may comprise one or more adjacent transpositions and a cycle permutation. A cycle permutation, denoted $\sigma_c$, is the permutation in which every element is moved to the next position and the element in the last position is moved to the first (or $0^{th}$) position. In other words, the $0^{th}$ element moves to the $1^{st}$ position, the $1^{st}$ element moves to the $2^{nd}$ position, and so on, so that the $i^{th}$ element is moved to the $(i+1)^{th}$ position, up to the $(n-2)^{th}$ element which is moved to the $(n-1)^{th}$ position. The $(n-1)^{th}$ element is then moved to the $0^{th}$ position (see for example, FIG. 4):

$$\sigma_c x = (x_{n-1}, x_0, x_1, \ldots, x_{n-2})$$

It can easily be shown that any input vector permutation $\sigma_i$ in Sym(n) can be generated from the set of permutations $\{\sigma_{at\text{-}0}, \sigma_c\}$. For example, as described above, if the input vectors x comprise three input elements (i.e. n=3) then there are n!=6 permutations i.e. Sym(n)={$\sigma_0, \sigma_1, \sigma_2, \sigma_3, \sigma_4, \sigma_5$}. Each of the input vector permutations $\sigma_i$ can be written as a combination of one or more permutations in the set {$\sigma_{at\text{-}0}, \sigma_c$} as shown below:

$$\sigma_0(x_0,x_1,x_2) = (x_0,x_1,x_2) = \sigma_{at\text{-}0} \sigma_{at\text{-}0} x = x$$

$$\sigma_1(x_0,x_1,x_2) = (x_0,x_2,x_1) = \sigma_{at\text{-}0} \sigma_c x$$

$$\sigma_2(x_0,x_1,x_2) = (x_1,x_0,x_2) = \sigma_{at\text{-}0} x$$

$$\sigma_3(x_0,x_1,x_2) = (x_1,x_2,x_0) = \sigma_c \sigma_c x$$

$$\sigma_4(x_0,x_1,x_2) = (x_2,x_0,x_1) = \sigma_c x$$

$$\sigma_5(x_0,x_1,x_2) = (x_2,x_1,x_0) = \sigma_c \sigma_{at\text{-}0} x$$

Specifically, if the first permutation is the identity map and can be generated by performing $\sigma_{at\text{-}0}$ twice; the second permutation $\sigma_1$ can be generated by cycling the elements (i.e. by performing permutation $\sigma_c$) and then swapping the $0^{st}$ and $1^{nd}$ elements (i.e. by performing permutation $\sigma_{at\text{-}0}$); the third permutation $\sigma_2$ can be generated by swapping the $0^{th}$ and $1^{st}$ elements (i.e. by performing permutation $\sigma_{at\text{-}0}$); the fourth permutation $\sigma_3$ can be generated by cycling the elements (i.e. by performing permutation $\sigma_c$) and then by cycling the elements again (i.e. by performing permutation $\sigma_c$); the fifth permutation $\sigma_4$ can be generated by cycling the elements (i.e. by performing permutation $\sigma_c$); and the sixth permutation $\sigma_5$ can be generated by swapping the $0^{th}$ and $1^{st}$ elements (i.e. by performing permutation $\sigma_{at\text{-}0}$), and then cycling the elements (i.e. by performing permutation $\sigma_c$).

Accordingly, in some cases, the generating set G may comprise {$\sigma_{at\text{-}0}, \sigma_c$} (see, for example FIG. 4). Verifying that an instantiation of the hardware design is permutation respecting for each input vector permutation in such a generating set G comprises generating and verifying a set of assertions for only two permutations. This significantly reduces, particularly for large n, the number of assertions that have to be generated relative to verifying each relevant input vector permutation as there may be up to n! relevant input vector permutations, and relative to verifying each input vector permutation in a generating set comprising n−1 adjacent transpositions. However, since formal verification tools tend to be better at verifying things that are similar than things that are different—and x will be significantly different from $\sigma_c x$ as all the elements will be in different positions—some formal verification tools may not be able to efficiently verify that an instantiation of the hardware design is permutation respecting for a cycle permutation. This may, however, be dependent on the formal verification tool and/or the configuration (e.g. internal structure) of the component.

It will be evident to a person of skill in the art that these are example generating sets only and that other suitable generating sets may be used. For example, other generating sets include any adjacent transposition (e.g. $\sigma_{at\text{-}1}$) and a cycle permutation.

Once the formal verification that an instantiation of the hardware design is permutation respecting for each of one or more relevant input vector permutations over a set of input vectors K has been completed, the method 200 may end or the method 200 may proceed to block 208.

At block 208, the formal verification tool used to perform the verification may output one or more signals that indicates whether the verifications were successful. For example, when the formal verification tool is used to verify an assertion, the formal verification tool may output a signal that indicates whether or not the assertion is true (i.e. the asserted property is true for all valid states or sequence of states of the hardware design), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-device running the formal verification tool has run out of memory or because the formal verification tool has determined that a certain amount of progress has not been made after a predefined period of time.

Where an assertion is not valid or has not been successfully verified the formal verification tool may also output information indicating a state or a sequence of states of the hardware design which cause the assertion to fail. For example, the formal verification tool may output a trace of the verification indicating at what point, state or sequence of states the failure occurred. Once a signal has been output indicating whether the verifications were successful the method 200 may end or the method 200 may proceed to block 210.

At block 210, a determination may be made as to whether the output signal(s) indicate that the verification was successful. If the output signal(s) indicate that the verifications were successful indicating that an instantiation of the hardware design will behave correctly for all input vectors in the input space, then the method 200 may proceed to block 214 where the component defined by the hardware design is implemented in hardware. If, however the output signal(s) indicate that at least one of the verifications was not successful indicating that an instantiation of the hardware design will not behave correctly for all input vectors in the input space then the method 200 may proceed to block 212 where the hardware design is modified to correct an error in the hardware design that caused the unexpected behaviour. Once the hardware design has been modified the modified hardware design may be re-verified (e.g. blocks 202-210 may be repeated for the modified hardware design).

Although in the example method 200 of FIG. 2, blocks 204 and 206 are executed sequentially, in other examples they may be executed in the reverse order (e.g. block 206 may be executed before block 204) and/or they may be executed in parallel.

Although in the example method 200 of FIG. 2 the verifications described with respect to blocks 204 and 206 are completed via formal verification, in other examples the verifications may be completed via other suitable verification methods. For example, alternatively one or more of the verifications described with respect to blocks 204 and 206 may be implemented via simulation-based verification.

Figure 5:
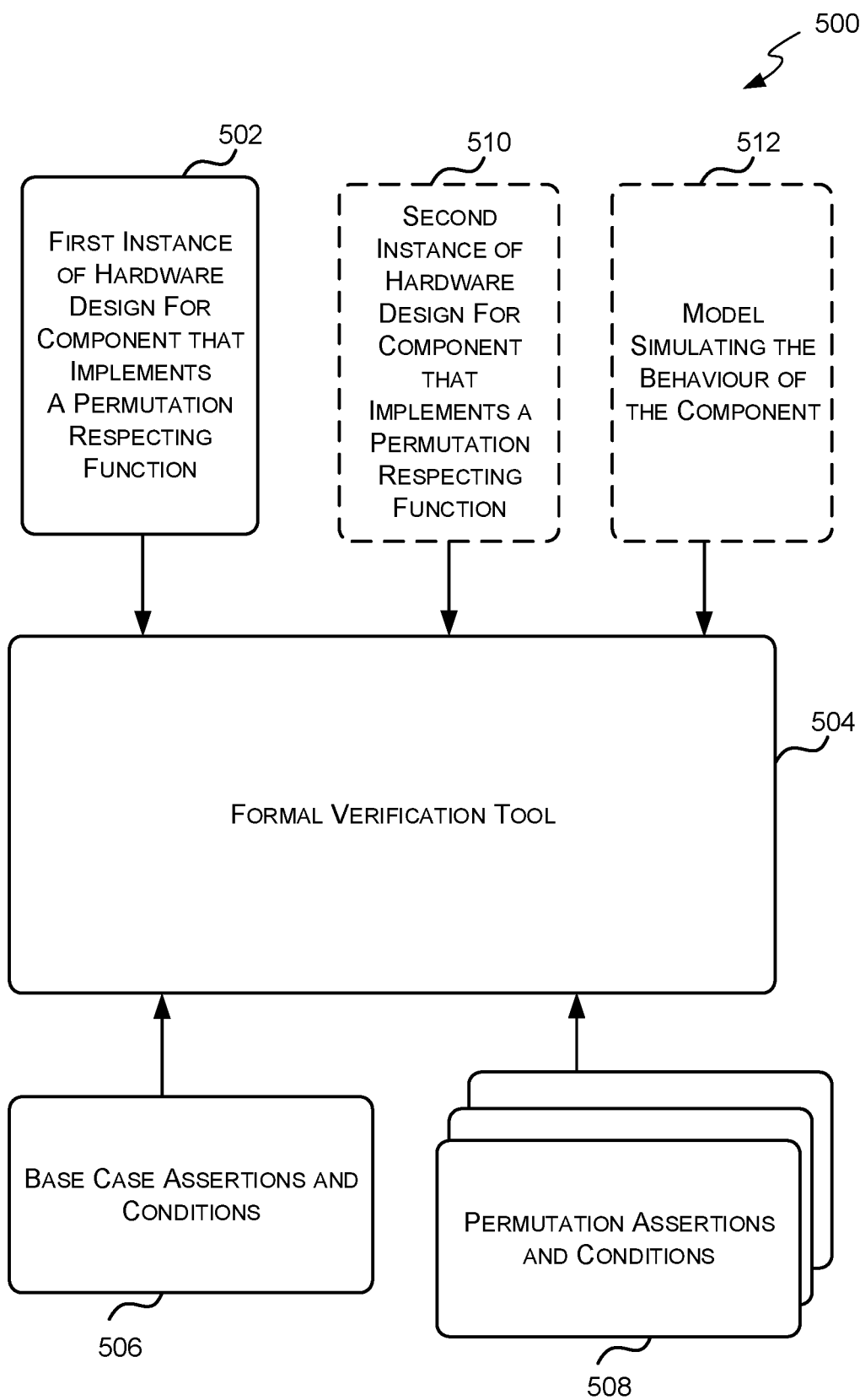
FIG. 5 is a block diagram of an example system for verifying a hardware design for a component that implements a permutation respecting function.

Reference is now made to FIG. 5 which illustrates an example system 500 for performing the method 200 of FIG. 2. The system 500 may be implemented by one or more computing-based devices, such as the computing-based device 600 described below with reference to FIG. 6. For example, one or more of the components of the system 500 of FIG. 5 may be implemented as computer-readable instructions that, when executed at a computing-based-device, cause the computing-based device to perform the function of that component described below.

The system 500 comprises a hardware design for a component that implements a permutation respecting function 502; a formal verification tool 504; a set of base case assertions and conditions 506; and a set of permutation assertions and conditions 508 for each input vector permutation to be verified. Depending on the format of the assertions the system 500 may also comprise a second instance of the hardware design 510 and/or a model of the hardware design 512. Specifically, if one or more of the assertions compares the output of an instantiation of the hardware design to another instantiation of the hardware design then the system 500 may comprise a second instance of the hardware design, and if one or more of the assertions compares the output of an instantiation of the hardware design to the output of a model of the hardware design then the system 500 may comprise a model of the hardware design 514. In general, the formal verification tool 504 is configured to formally verify the assertions are true for the hardware design under the associated conditions using mathematical reasoning.

As described above, a hardware design is a description of the structure and function of an integrated circuit which when processed at an integrated circuit manufacturing system causes the integrated circuit manufacturing system to generate an integrated circuit described by the hardware design. Accordingly, a hardware design 502, 512 for a component that implements a permutation respecting function is a description of the structure and function of an integrated circuit that implements a permutation respecting function, which, when processed at an integrated circuit manufacturing system causes the integrated circuit manufacturing system to generate an integrated circuit that implements a permutation respecting function.

As described above, the formal verification tool 504 is a software tool that is capable of performing formal verification of a hardware design. Formal verification tools include, but are not limited to formal model checkers (which also may be referred to as formal property checkers) which are configured to formally verify a property of a hardware design, and formal equivalence checkers which are configured to formally verify the equivalence of two designs (e.g. two hardware designs, a hardware design and a netlist, or a hardware design and a model of the hardware design etc).

Although FIG. 5 illustrates a single formal verification tool 504, in other examples the system may comprise multiple formal verification tools which allow the formal verification of the base case assertions and permutation assertions to be performed in parallel. Where there are multiple formal verification tools all of the formal verification tools may be of the same type (e.g. all of the formal verification tools may be formal model checkers or all of the formal verification tools may be formal equivalence checkers), or, two or more of the formal verification tools may be of different types (e.g. at least one of the formal verification tools may be a formal model checker and at least one of the formal verification tools may be a formal equivalence checker). The formal verification tools may be of different types in some cases because it may be more efficient in these cases to verify some of the assertions using a formal model checker and verify other assertions using a formal equivalence checker. For example, as described in more detail below it may be more efficient, in some cases, to verify the base case assertions using a formal model checker and to verify the permutation assertions using a formal equivalence checker.

The base case assertions and conditions 506 comprise one or more assertions and one or more conditions under which the assertions are to be verified, such that if the one or more assertions are verified to be true for the hardware design under the specified conditions then it will be verified that an instantiation of the hardware design 502 produces the correct (or expected) result for a subset of input vectors of the input space.

In some cases, the base case assertions 506, may comprise an assertion that asserts a property that establishes that the output is correct based only on the signals and/or states of a single instance of the hardware design. For example, where the component implements a function that sorts the input elements in ascending order the base case assertions may comprise an assertion that states that the output is equal to the input. The following is an example of such an assertion where there are three input elements $x_i$ and three output elements $y_i$:

assert property ((x0==y0) && (x1==y1) && (x2==y2))

In these cases, the formal verification comprises evaluating states of a single instance of the hardware design. Since formal model checkers are optimized to verify properties of a single design over several clock cycles it may be beneficial in these cases to verify such base case assertions using a formal model checker. However, while using a formal model checker in these cases may provide certain advantages (e.g. in terms of efficiency), a person of skill in the art would understand that this does not, however, preclude the use of a formal equivalence checker to verify such base case assertions.

In other cases, the base case assertions 506 may comprise an assertion that asserts a property that establishes that the output is correct (or is the expected output) by comparing the output of an instantiation of the hardware design to the output of a model of the hardware design. The following is an example of such an assertion wherein A is the component of the hardware design and M is the model of the component and yi are the output elements:
assert property ((A.y0==M.y0) && (A.y1==M.y1) && (A.y2==M.y2)))
In these cases, the formal verification comprises performing a comparison of an instantiation of the hardware design for the component and a model of the component. Since formal equivalence checkers are designed and optimized for comparing two designs it may be beneficial in these cases to verify such base case assertions using a formal equivalence checker. However, while using a formal equivalence checker in these cases may provide certain advantages (e.g. in terms of efficiency), a person of skill in the art would understand that this does not, however, preclude the use of a formal model checker to verify such base case assertions. A model of the component is generally a high-level model (e.g. written in C) which simulates the behaviour of the component.

There will be a set of permutation assertions and conditions 508 for each permutation that is verified in block 206. Each set of permutation assertions comprises one or more assertions and one or more conditions under which the assertions are to be verified, such that if the one or more assertions are verified to be true for the hardware design under the specified conditions then it will be verified that an instantiation of the hardware design is permutation respecting for the input vector permutation (i.e. the hardware design produces permutation related outputs for any input vector and the permutation of that input vector) over a set of input vectors.

The permutation assertions 508 for a specific permutation may comprise an assertion that asserts a property that establishes that the instantiation of the hardware design respects that specific permutation by comparing the output of a first instantiation of the hardware design to the output of a second instantiation of the hardware design. The following is an example of such an assertion where A1 is the component of the first instantiation of the hardware design and A2 is the component of the second instantiation of the hardware design and yi are the output elements:
assert property ((A1.y0==A2.y0) && (A1.y1==A2.y1) && (A1.y2==A2.y2))
In these cases, the formal verification comprises performing a comparison of two instances of the hardware design for the component. Since formal equivalence checkers are designed and optimized for comparing two designs it may be beneficial in these cases to verify such permutation assertions using a formal equivalence checker. However, while using a formal equivalence checker in these cases may provide certain advantages (e.g. in terms of efficiency), a person of skill in the art would understand that this does not, however, preclude the use of a formal model checker to verify such permutation assertions.

Each set of assertions and conditions 506, 508 is bound to the appropriate hardware design(s) and/or model to be able to verify the asserted properties. The hardware design(s), model (if required), base case assertions and conditions, permutation assertions and conditions, and bindings are then loaded into the formal verification tool (or formal verification tool). The formal verification tool is then configured to verify each set of assertions for the hardware design under the associated conditions. In other words, the formal verification tool is configured to formally verify the base case assertions are true for the hardware design under the base case conditions; and formally verify, for each set of permutation assertions, that the permutation assertions are true for the hardware design under the associated permutation conditions. Where there is a plurality of formal verification tools, two or more of the assertion verifications may be performed in parallel to reduce the time to complete the verification.

As described above, in formal verification the hardware design is transformed into a mathematical model (e.g. a state transition system, or a flow graph) to thereby provide an instantiation of the hardware design which can be tested to verify the hardware design, and the formal properties to be verified (e.g. the asserted properties) are expressed using mathematical logic using a precise syntax or language with a precise mathematical syntax and semantics.

A formal assertion is verified by searching the entire reachable state space of the instantiation of the hardware design (e.g. state-transition system, or flow graph) without explicitly traversing all the states. The search is done by, for example, encoding the states using efficient Boolean encodings using Binary decision diagrams (BDDS), or using advanced SAT (satisfiability-based bounded model checking) based techniques. In some cases, tools can be used to implement techniques, such as, but not limited to, abstraction, symmetry, symbolic indexing, and invariants to improve performance and achieve scalability.

When a formal verification tool 504 is used to verify an assertion, the formal verification tool 504 may output an indication of whether or not the assertion is valid (i.e. the asserted property is true for all valid states or sequence of states), which may also be referred to herein as the assertion being successfully verified. The output may be yes, the assertion is valid or has been successfully verified; no, the assertion is not valid (i.e. it is not true or has failed for at least one valid state or sequence of states) or has not been successfully verified; or the formal verification was inconclusive. The formal verification may be inconclusive, for example, because the computing-based device running the formal verification tool 504 has run out of memory or because the formal verification tool 504 has determined that a certain amount of progress has not been made after a predefined period of time.

Where an assertion is not valid or has not been successfully verified, the formal verification tool 504 may also output information indicating a state or sequence of states of the hardware design which causes the assertion to fail. For example, the formal verification tool 504 may output a trace of the verification indicating at what point, state or sequence of states the failure occurred.

Where one of the verifications is performed via other verification methods the system may additionally, or alternatively, comprise one or more other verification tools. For example, where one or more of the verifications is performed via simulation-based verification the system may comprise a simulation engine.

As is known to those of skill in the art, a simulation engine is a software tool capable of performing simulation-based verification of a hardware design. In particular, a simulation engine monitors the output of one or more instantiations of the hardware design in response to each input vector in the test set (e.g. each input vector in the subset $\mathcal{B}$) to determine a specific property (e.g. that output of an instantiation is correct with respect to the function, or that the outputs of two different instantiations of the hardware design produce permutation related outputs for related input vectors).

A simulation engine may perform the simulation-based verification using any known method. For example, the simulation engine may receive the hardware design in, for example HDL, convert the HDL to another language, such as C, and perform the simulation on the C code; the simulation engine may receive the hardware design as, for example, HDL and perform the simulation directly on the HDL; or the simulation engine may implement the hardware design in hardware and perform the simulation on the hardware. Once the simulation is complete the simulation engine may output an indication of whether or not the hardware design passed the simulation.

Mathematical Proof 1

The following is a mathematical proof that establishes that formally verifying that $A(x)=A(\sigma x)$ for all input vector permutations $\sigma$ in the group R of relevant permutations for all input vectors x in the subset $\mathcal{B}$ will establish that $A(x)=A(\sigma x)$ for all input vectors x in the input space X, provided that $\mathcal{B} \subset X$ is such that for all $x \in X$ there exists a $\phi \in R$ such that $\phi x \in \mathcal{B}$.

Lemma: If for every $x \in \mathcal{B}$ and $\sigma \in R$ we have $A(x)=A(\sigma x)$, then for every $x \in X$ and $\sigma \in R$, $A(x)=A(\sigma x)$.

Proof. Choose $x \in X$ and $\sigma \in R$. There exists a permutation $\phi$ such that $\phi x \in \mathcal{B}$, let $y=\phi x$. Then $x=\phi^{-1}y$ and $A(x)=A(\phi^{-1}y)=A(y)$. Similarly, there exists a permutation $\psi$ such that $\psi(\sigma x) \in B$. Let $z=\psi(\sigma x)$. Then $A(z)=A(\psi^{-1}z)=A(\sigma x)$. So it is sufficient to show that $A(z)=A(y)$.

Since both y and z are permutations of x, it follows that y and z are permutations of each other: the permutation $z=\psi\sigma\phi^{-1}$ is such that $\tau y=z$ and $A(y)=A(\tau y)$ since $y \in B$.

Mathematical Proof 2

The following is a mathematical proof that establishes that formally verifying that $A(x)=A(\rho x)$ for each input vector permutation $\rho$ in a set G which generates the group of all relevant permutations R, and for all input vectors x in the input space X, will establish that $A(x)=A(\sigma x)$ for all $\sigma$ in R and for all input vectors x in the input space X.

Lemma. For a component A and a generating set $G=\{\phi_i | i=1, \ldots, m\}$ for R if $A(x)=A(\phi_i x)$ for $i=1, \ldots, m$ and all $x \in X$, then $A(x)=A(\sigma x)$ for all $\sigma \in R$ and all $x \in X$.

Proof. Since $\{\phi_i | i=1, \ldots, m\}$ generates R, then $$\sigma = \phi_{i_0}^{s_0} \ldots \phi_{i_k}^{s_k}$$

for some $i_0 \ldots i_k \in \{1, \ldots m\}$, $s_0 \ldots s_k \in \{1, -1\}$. The proof proceeds by induction on k.

When k=0, either $\sigma=\phi_i$ for some i in which case $A(x)=A(\sigma x)=A(\phi_i x)$, or $\sigma=\phi_i^{-1}$. In the latter case it is observed that $A(x)=A(\phi_i\phi_i^{-1}x)$. By the hypotheses of the lemma $A(y)=A(\phi_i y)$ for all y, so for $y=\phi_i^{-1}x$, $A(\phi_i^{-1}x)=A(\phi_i\phi_i^{-1}x)=A(x)$.

Assuming the result holds for all generator strings $$\phi_{i_0}^{s_0} \ldots \phi_{i_{k-1}}^{s_{k-1}}$$

of of length k as inductive hypothesis, it follows that:

$$A(\phi_{i_0}^{s_0} \ldots \phi_{i_k}^{s_k} x) = A(\phi_{i_k}^{s_k} x)$$

and by the argument for the base case:

$$A(\phi_{i_k}^{s_k} x) = A(x).$$

Test Results

The following is a summary of the verification of three components A1, A2 and A3 which each implement a sorting function which receives an input vector x comprising n input elements $x_0$ to $x_{n-1}$ and outputs a vector in which the input elements are in ascending order. A2 implemented the sorting function by comparing all of the input elements to each other and seeing how many times each was the larger. A1 and A3 implemented odd-even-merge sorters, which work by sorting subsets of the inputs and then merging the subsets together and sorting them again. A1 and A3 differed in the comparison method.

The following formal verifications were performed on each component:

Naïve—Formally verified that the output of an instantiation of the component is correct for all possible input vectors x in the input space X by formally verifying that the output of an instantiation of the component was equal to the output of a C model (which worked similar to A2) for all input vectors x in the input space X.

Base Case Specification—Formally verified that the output of an instantiation of the component is correct (according to the specification) for all input vectors x in which the input elements are in ascending order, by formally verifying the result according to the specification.

Base Case C Model—Formally verified that the output of an instantiation of the component matched the output of the C model for all input vectors x in the input space X in which the input elements are in ascending order.

Adjacent Transposition—Formally verified that, for each of the adjacent transpositions $\sigma_{at-0}$, $\sigma_{at-1}$, $\sigma_{at-2}$, $\sigma_{at-3}$, $\sigma_{at-4}$, $\sigma_{at-5}$, $\sigma_{at-6}$, $Aj(x)=Aj(\sigma_{at-i}x)$ for all input vectors x in the input set X, where j is the number of the component that is being verified and an adjacent transposition $\sigma_{at-i}$ swaps the position of the $i^{th}$ and $(i+1)^{th}$ input elements.

Cycle—Formally verified that $Aj(x)=Aj(\sigma_c x)$ for all x in the input set X, where j is the number of the component being verified and $\sigma_c$ is a cycle permutation wherein each input element is shifted one position and the last input element (i.e. the $(n-1)^{th}$ input element) is shifted to the first position (i.e. position zero).

Enlarged Base Case—Formally verified that the output of an instantiation of the component is correct (according to the specification) for all x in the input space X wherein the first half of the input elements are in ascending order and the second half of the input elements are in ascending order, by formally verifying the output according to the specification.

Table 2 summarizes the time taken (in seconds) to complete each of the formal verifications listed above for each of the components A1, A2, A3 when there are 8 input elements (i.e. n=8) and each input element $x_i$ comprises an eight-bit binary number. It is noted that what is recorded in Table 2 for the adjacent transposition formal verification is the mean, or average, time for the individual adjacent transposition verifications to complete. It is also noted that this is a representative set of completion times and similar relationships between the completion times were seen for other numbers of input elements and other numbers of bits in the input elements. It is also noted that a value of "NA" in Table 2 means that the verification did not complete within a reasonable time.

TABLE 2

|  | A1 (seconds) | A2 (seconds) | A3 (seconds) |
|---|---|---|---|
| Naive | 13281 | 125 | 10904 |
| Base Case Specification | 6 | 5 | 3 |
| Base Case C Model | 39 | 14 | 38 |
| Mean Adjacent Transposition | 3175 | 5 | 3288 |
| Cycle | NA | 891 | NA |
| Enlarged Base Case Specification | 38 | 36 | 16 |

Table 2 illustrates that the time to verify that an instantiation of the component will produce the correct result for the base cases (the input vector where the input elements are in ascending order) is significantly less than the time to verify that an instantiation of the component will produce the correct result for all inputs. This is expected as the number of input vectors verified in the base case verification is significantly smaller than the number of input vectors verified in the nave verification. Specifically, in the nave verification all input vectors x in the input space X are verified, whereas in the base case verification only those input vectors x in which the input elements x are in ascending order are verified. The input elements that are in ascending order amount to roughly 1/n! of the input vectors in the input space X.

Table 2 also shows that it takes, on average, less time to verify that an instantiation of the component is permutation respecting for an adjacent transposition. Since there may be up to n−1 adjacent transpositions to verify, Table 2 indicates that component A2 can be verified much more quickly by verifying that the component produces the correct result for the base cases and then verifying that the component is permutation respecting for n−1 adjacent transpositions (even if the adjacent transposition verifications are performed sequentially). As for components A1 and A3, Table 2 appears to indicate that, although the total time to verify that an instantiation of the component is permutation respecting for all adjacent transpositions may be greater than the time to complete the nave verification, if the verifications of the adjacent transpositions are performed in parallel, the verification can be completed in less time than the nave verification.

However, when the adjacent transposition verification is broken down by adjacent transposition it can be seen that some adjacent transposition verifications take significantly longer than other adjacent transposition verifications. This is illustrated in Table 3 which shows the time (in seconds) to complete the verification of each adjacent transposition for component A1 (i.e. to formally verify that an instantiation of the component is permutation respecting for the adjacent transposition). It is noted that the results for A3 were similar.

TABLE 3

| $\sigma_{at-i}$ | Completion Time (seconds) |
|---|---|
| $\sigma_{at-0}$ | 37 |
| $\sigma_{at-1}$ | 265 |
| $\sigma_{at-2}$ | 27 |
| $\sigma_{at-3}$ | 21691 |
| $\sigma_{at-4}$ | 16 |
| $\sigma_{at-5}$ | 178 |
| $\sigma_{at-6}$ | 13 |

It can be seen that around 97% of the total time to complete the adjacent transposition verification for A1 is the time taken to verify that A1 is permutation respecting for the adjacent transposition $\sigma_{at-3}$. This indicates that even if the verification of the adjacent transpositions were performed in parallel, it would take less time to perform the nave verification than to verify that the instantiation of the component is permutation respecting for the adjacent transposition $\sigma_{at-3}$.

It was discovered that if instead of having a minimum sized base case (i.e. instead of having the base cases comprise the input vectors in which the input elements are in ascending order) the set of base cases is enlarged to allow for the exclusion of the fourth adjacent transposition $\sigma_{at-3}$ from the generating set G of the relevant permutation group R (i.e. the base cases include the input vectors in which the first half of the input elements are in ascending order and the second half of the input elements are in ascending order), the verification of the fourth adjacent transposition $\sigma_{at-3}$ does not need to be performed. It can be seen from Table 2 that increasing the number of base cases in this manner only increases the time to verify the correctness of the base cases against the specification from 6 seconds to 38 seconds. This reduces the quickest verification time for A1 from 13281 seconds (3 hours 41 minutes) to 574 seconds (under 10 minutes). If the base case verification and the adjacent transposition verifications are performed in parallel the verification time can be reduced to 265 seconds, which is just less than 2% of the time to complete the nave verification. It may be possible to reduce the time to complete the verification of A1 further by expanding the base cases further to include the next-slowest adjacent transposition to verify (i.e. in this case $\sigma_{at-1}$), and not verifying that adjacent transposition.

Table 2 also shows that the formal verification tool typically found verifying that an instantiation of the test components (A1, A2 and A3) was permutation respecting for the cycle permutation $\sigma_c$ to be difficult. Verifying that A2 was permutation respecting for the cycle permutation took 891 seconds to complete, which is significantly longer than the nave verification of A2. The verification tool was not even able to complete the verification of the cycle permutation for A1 or A3 in a reasonable time. A similar pattern was seen for other numbers of input elements, and for input elements with another number of bits. Accordingly, it does not appear that using a generating set containing a cycle permutation is an efficient way to verify the hardware design of a component that implements a sorting function in a manner similar to A1, A2 and/or A3. However, it can be seen from Table 2 that the ease at which a formal verification tool can complete the formal verification of a property can be dependent on the internal structure of the component that is being verified so using a generating set containing a cycle permutation (or another complex permutation) may be efficient for verifying the hardware design of a component that implements another permutation respecting function or implements a sorting function in another manner.

Figure 6:
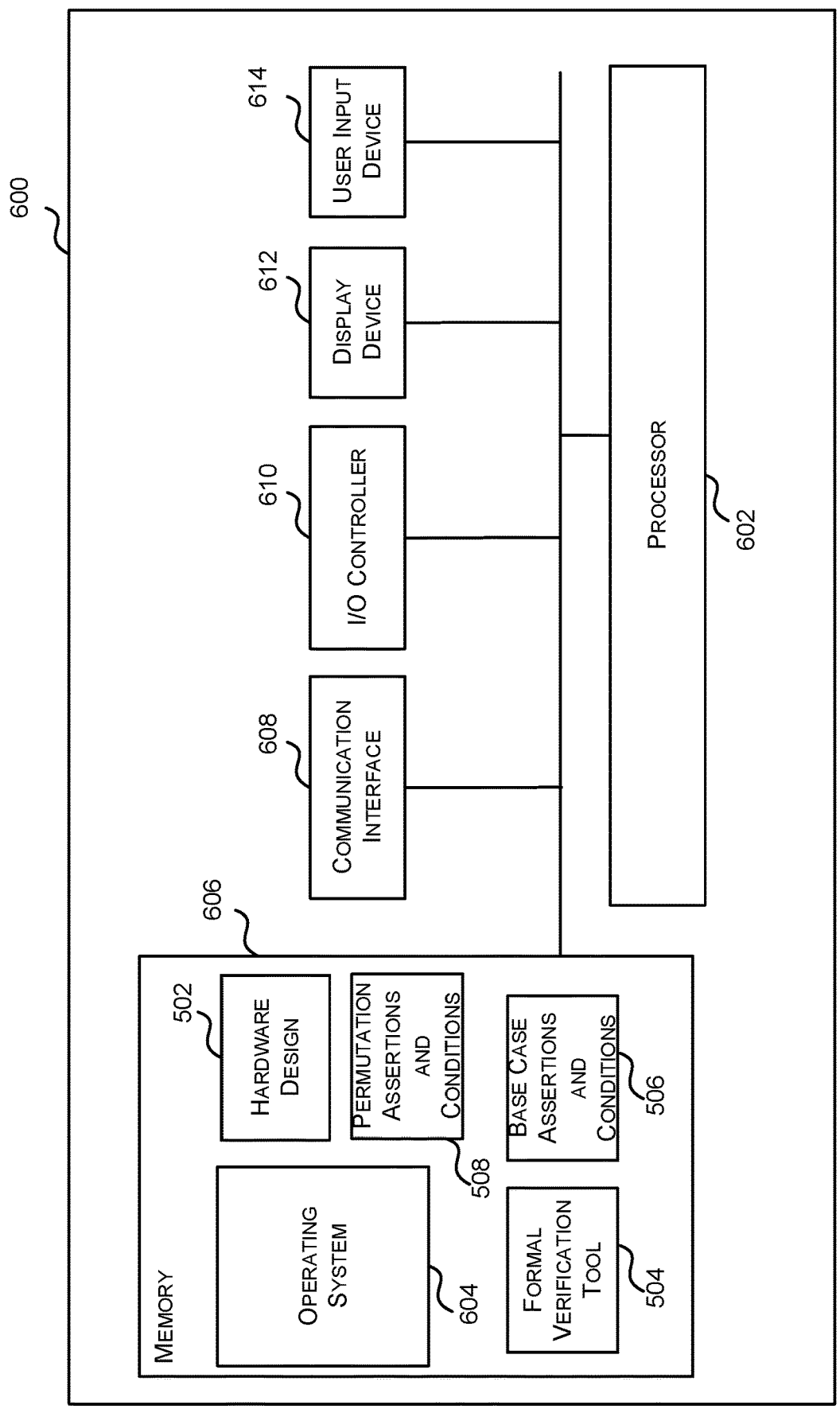
FIG. 6 is a block diagram of an example computing-based device.

FIG. 6 illustrates various components of an exemplary computing-based device 600 which may be implemented as any form of a computing and/or electronic device, and in which embodiments of the methods and systems described herein may be implemented.

Computing-based device 600 comprises one or more processors 602 which may be microprocessors, controllers or any other suitable type of processors for processing computer executable instructions to control the operation of the device in order to verify a property of a hardware design for a component that implements a permutation respecting function. In some examples, for example where a system on a chip architecture is used, the processors 602 may include one or more fixed function blocks (also referred to as accelerators) which implement a part of the method of verifying a hardware design for a component that implements a permutation respecting function, in hardware (rather than software or firmware). Platform software comprising an operating system 604 or any other suitable platform software may be provided at the computing-based device to enable application software, such as a formal verification tool 504, to be executed on the device.

The computer executable instructions may be provided using any computer-readable media that is accessible by computing-based device 600. Computer-readable media may include, for example, computer storage media such as memory 606 and communications media. Computer storage media (i.e. non-transitory machine readable media), such as memory 606, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (i.e. non-transitory machine readable media, e.g. memory 606) is shown within the computing-based device 600 it will be appreciated that the storage may be distributed or located remotely and accessed via a network or other communication link (e.g. using communication interface 608).

The computing-based device 600 also comprises an input/output controller 610 arranged to output display information to a display device 612 which may be separate from or integral to the computing-based device 600. The display information may provide a graphical user interface. The input/output controller 610 is also arranged to receive and process input from one or more devices, such as a user input device 614 (e.g. a mouse or a keyboard). This user input may be used to initiate verification. In an embodiment the display device 612 may also act as the user input device 614 if it is a touch sensitive display device. The input/output controller 610 may also output data to devices other than the display device, e.g. a locally connected printing device (not shown in FIG. 6).

Figure 7:
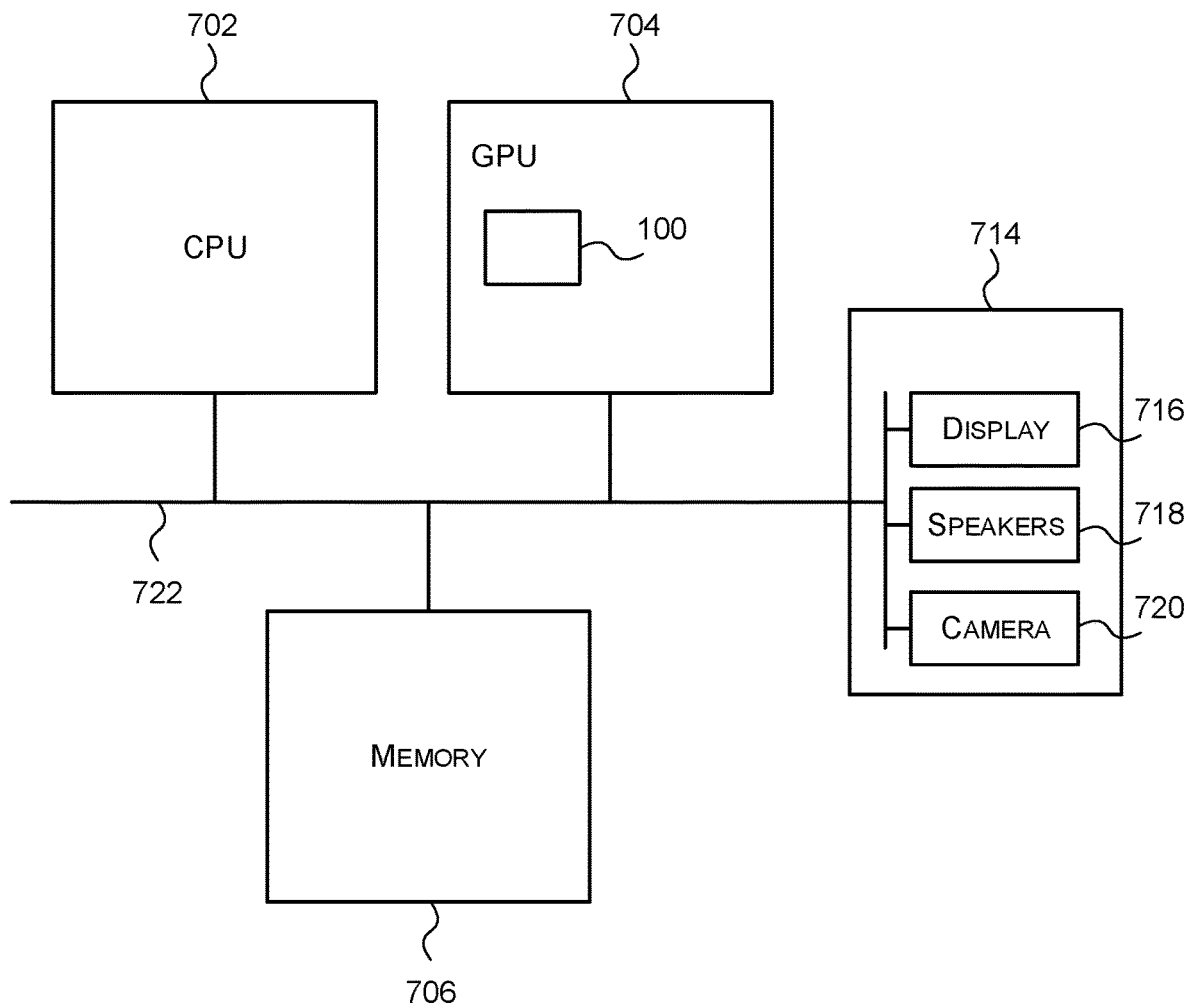
FIG. 7 is a block diagram of an example computer system in which a component that implements a permutation respecting function may be implemented.

FIG. 7 shows a computer system in which a component 100 that implements a permutation respecting function may be implemented. The computer system comprises a CPU 702, a GPU 704, a memory 706 and other devices 714, such as a display 716, speakers 718 and a camera 720. The GPU 704 is shown as comprising the component 100. In other examples, the component 100 may be implemented in the CPU 702. The components of the computer system can communicate with each other via a communications bus 722.

A component that implements a permutation respecting function described herein may be embodied in hardware on an integrated circuit. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset (which may also be referred to as a hardware design) that when processed (i.e. run) in an integrated circuit manufacturing system configures the system to manufacture a computing device comprising any apparatus described herein. An integrated circuit definition dataset may be, for example, an integrated circuit description.

Therefore, there may be provided a method of manufacturing, at an integrated circuit manufacturing system, a component for implementing a permutation respecting function as described herein. Furthermore, there may be provided an integrated circuit definition dataset that, when processed in an integrated circuit manufacturing system, causes the method of manufacturing a component implementing a permutation respecting function to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS® and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset (e.g. a hardware design) at an integrated circuit manufacturing system so as to configure the system to manufacture a component that implements a permutation respecting function will now be described with respect to FIG. 8.

Figure 8:
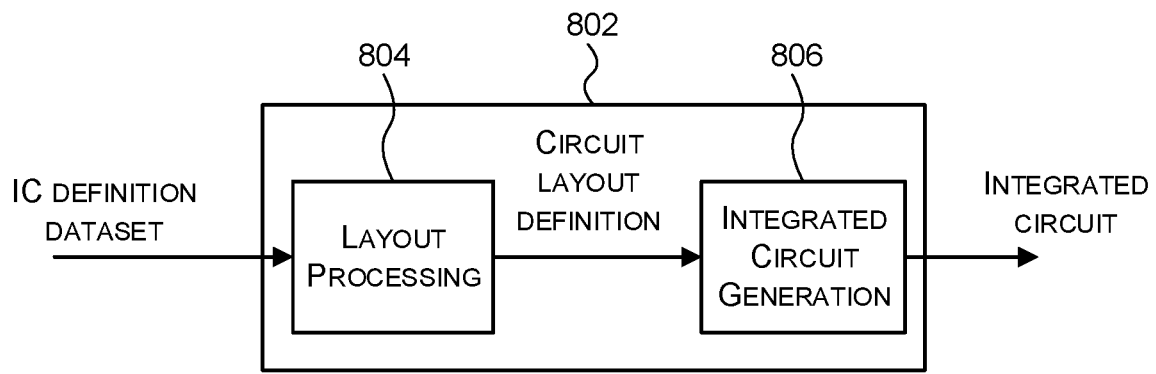
FIG. 8 is a block diagram of an example integrated circuit manufacturing system for generating an integrated circuit embodying a component that implements a permutation respecting function.

FIG. 8 shows an example of an integrated circuit (IC) manufacturing system 802 which is configured to manufacture a component that implements a permutation respecting function as described in any of the examples herein. In particular, the IC manufacturing system 802 comprises a layout processing system 804 and an integrated circuit generation system 806. The IC manufacturing system 802 is configured to receive an IC definition dataset/hardware design (e.g. defining a component that implements a permutation respecting function as described in any of the examples herein), process the IC definition dataset, and generate an IC according to the IC definition dataset (e.g. which embodies a component as described in any of the examples herein). The processing of the IC definition dataset configures the IC manufacturing system 802 to manufacture an integrated circuit embodying a component implementing a permutation respecting function as described in any of the examples herein.

The layout processing system 804 is configured to receive and process the IC definition dataset/hardware design to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 804 has determined the circuit layout it may output a circuit layout definition to the IC generation system 806. A circuit layout definition may be, for example, a circuit layout description.

The IC generation system 806 generates an IC according to the circuit layout definition, as is known in the art. For example, the IC generation system 806 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 802 may be implemented all in one location, e.g. by one party. Alternatively, the IC manufacturing system 802 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a component that implements a permutation respecting function without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset/hardware design, when processed in an integrated circuit manufacturing system, may cause an integrated circuit manufacturing system to generate a device as described herein. For example, the configuration of an integrated circuit manufacturing system in the manner described above with respect to FIG. 8 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 8, the IC generation system may further be configured by an integrated circuit definition dataset/hardware design to, on manufacturing an integrated circuit, load firmware onto that integrated circuit in accordance with program code defined at the integrated circuit definition dataset or otherwise provide program code with the integrated circuit for use with the integrated circuit.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of verifying a hardware design for a component that implements a permutation respecting function, the component configured to receive an input vector comprising a plurality of input elements and generate an output based on the input vector and the function, the method comprising:
   verifying, at one or more processors, that an instantiation of the hardware design generates an expected output for each input vector of a subset of valid input vectors; and
   verifying by proving, at the one or more processors, that, for each of one or more input vector permutations, an instantiation of the hardware design generates permutation related outputs for any input vector in a set of valid input vectors and the permutation of that input vector;
   wherein each valid input vector that is not in the subset of valid input vectors can be obtained by applying one or more of the one or more input vector permutations to an input vector in the subset.

2. The method of claim 1, wherein the one or more input vector permutations comprises one or more transpositions that swap a position of two input elements in an input vector.

3. The method of claim 2, wherein at least one of the one or more transpositions is an adjacent transposition that swaps a position of two adjacent input elements in an input vector.

4. The method of claim 1, wherein each of the one or more input vector permutations is a transposition that swaps a position of two input elements in an input vector.

5. The method of claim 1, wherein the one or more input vector permutations comprises n−1 adjacent transpositions that swap a position of two adjacent input elements in an input vector, wherein n is a number of input elements in an input vector.

6. The method of claim 5, wherein the set of valid input vectors for an adjacent transposition that swaps the position of an $i^{th}$ input element and an $(i+1)^{th}$ input element comprises input vectors in which the $i^{th}$ input element is less than the $(i+1)^{th}$ input element, or input vectors in which the $i^{th}$ input element is greater than the $(i+1)^{th}$ input element.

7. The method of claim 1, wherein the one or more input vector permutations comprises a cycle permutation that shifts each input element in the input vector, except the input element in a last position of the input vector, to a next position in the input vector and shifts the input element in the last position to a first position of the input vector.

8. The method of claim 1, wherein the set of valid input vectors is equal to all valid input vectors.

9. The method of claim 1, wherein the one or more input vector permutations comprises z input vector permutations and z is less than a number of relevant input vector permutations, a relevant input vector permutation being an input vector permutation for which the function is permutation respecting and is not covered by the subset.

10. The method of claim 1, wherein the one or more input vector permutations comprises all relevant input vector permutations, a relevant input vector permutation being an input vector permutation for which the function is permutation respecting and is not covered by the subset; and the set of valid input vectors is equal to the subset of valid input vectors.

11. The method of claim 1, wherein the subset of valid input vectors comprises input vectors in which at least a portion of the input elements are in a predetermined order.

12. The method of claim 1, wherein the subset of valid input vectors comprises only one input vector for each set of input elements or the subset of valid input vectors comprises at least two input vectors for at least one set of input elements.

13. The method of claim 1, wherein the output of an instantiation of the hardware design in response to a first input vector is permutation related to the output of the instantiation of the hardware design in response to a permutation of the first input vector if the output of the instantiation of the hardware design in response to the permuted input vector can be deduced solely from the output of the instantiation of the hardware design in response to the first input vector and the permutation.

14. The method of claim 1, wherein verifying that an instantiation of the hardware design generates an expected output for each input vector of the subset of valid input vectors comprises formally verifying, using a formal verification tool, that an instantiation of the hardware design generates an expected output for each input vector of the subset of valid input vectors; and/or
   verifying that, for each of the one or more input vector permutations, an instantiation of the hardware design generates permutation related outputs for any input vector in a set of valid input vectors and the permutation of that input vector comprises formally verifying, using a formal verification tool, that, for each of the one or more input vector permutations, an instantiation of the hardware design generates permutation related outputs for any input vector in a set of valid input vectors and the permutation of that input vector.

15. The method of claim 1, further comprising outputting one or more signals indicating whether the verifications were successful.

16. The method of claim 1, further comprising, in response to determining that at least one verification was not successful, modifying the hardware design.

17. The method of claim 16, further comprising re-verifying the modified hardware design.

18. The method of claim 1, further comprising, in response to determining that the verifications were successful, manufacturing, using an integrated circuit manufacturing system, an integrated circuit embodying the component according to the hardware design.

19. A non-transitory computer readable storage medium having stored thereon computer readable instructions that, when executed at a computer system, cause the computer system to perform the method as set forth in claim 1.

20. A system for verifying a hardware design for a component that implements a permutation respecting function, the system comprising:

memory comprising:

the hardware design for a component that implements a permutation respecting function, the component configured to receive an input vector comprising a plurality of input elements and generate an output based on the input vector and the function; and one or more verification tools; and one or more processors configured to:

verify, using at least one of the one or more verification tools, that an instantiation of the hardware design generates an expected output for each input vector of a subset of valid input vectors; and verify by proving, using at least one of the one or more verification tools, that, for each of one or more input vector permutations, an instantiation of the hardware design generates permutation related outputs for any input vector in a set of valid input vectors and the permutation of that input vector;

wherein each valid input vector that is not in the subset of valid input vectors can be obtained by applying one or more of the one or more input vector permutations to an input vector in the subset.

* * * * *

UNITED STATES PATENT AND TRADEMARK OFFICE
CERTIFICATE OF CORRECTION

PATENT NO.         : 11,455,451 B2
APPLICATION NO.    : 16/367493
DATED              : September 27, 2022
INVENTOR(S)        : Robert McKemey et al.

It is certified that error appears in the above-identified patent and that said Letters Patent is hereby corrected as shown below:

In the Specification

Column 1, Line 8:
$(x_0, x_1, \ldots, x_{n-})$

Should be:
$(x_0, x_1, \ldots, x_{n-1})$

Column 1, Line 27:
$t(x) = F(\sigma x)$

Should be:
$t_\sigma F(x) = F(\sigma x)$

Column 5, Line 31:
$x_0, x_1, \ldots, x_{n-})$

Should be:
$(x_0, x_1, \ldots, x_{n-1})$

Signed and Sealed this
Twenty-seventh Day of December, 2022

*Katherine Kelly Vidal*

Katherine Kelly Vidal
*Director of the United States Patent and Trademark Office*